United States Patent [19]

Kover, Jr.

[11] Patent Number: 5,592,146
[45] Date of Patent: Jan. 7, 1997

[54] PROGRAMMABLE VEHICLE LIGHT CONTROLLER

[76] Inventor: Joseph Kover, Jr., 463 W. Creekside La., Kaysville, Utah 84037

[21] Appl. No.: 553,856

[22] Filed: Nov. 6, 1995

[51] Int. Cl.⁶ ........................ B60Q 1/76
[52] U.S. Cl. .................. 340/468; 340/469; 340/472; 307/10.8; 315/83
[58] Field of Search .................. 340/468, 463, 340/464, 469, 470, 471, 472, 473, 475, 476; 307/10.8; 315/82, 83

[56] References Cited

U.S. PATENT DOCUMENTS

| | | | |
|---|---|---|---|
| 4,928,036 | 5/1990 | Abboud | 315/82 |
| 4,965,461 | 10/1990 | McRoberts, Jr. et al. | 307/10.8 |
| 4,985,660 | 1/1991 | Cronk | 307/10.8 |
| 5,030,884 | 7/1991 | Roussey et al. | 315/83 |
| 5,434,553 | 7/1995 | Rhodes | 340/472 |

*Primary Examiner*—Jeffery Hofsass
*Assistant Examiner*—Nina Tong
*Attorney, Agent, or Firm*—Mallinckrodt & Mallinckrodt

[57] ABSTRACT

A vehicle lighting system, for use in automobiles or trucks has a tail lamp relay, connected so electrical current flows through the vehicle battery, a tail lamp, and the tail lamp relay when the relay is on; a tail lamp switch; a battery low voltage sensor; taillamp programming means; and means for sensing that the vehicle is in operation. The system also has control circuitry that turns on the relay in the first state when the vehicle is in operation and the tail lamp switch is on, or following the vehicle ceasing operation, the taillamp programming means is on, and the battery low voltage sensing means senses a high battery voltage, but where the relay is turned off when the vehicle is not in operation and either the taillamp programming means is off, the taillamp switch is off, or the battery low voltage sensing means senses a low battery voltage.

18 Claims, 9 Drawing Sheets

PROGRAMMABLE VEHICLE LIGHT CONTROLLER

BACKGROUND OF THE INVENTION

1. Field of the Invention

The invention relates to control systems for automotive vehicle lighting systems. Specifically, the invention comprises a programmable circuit that tailors the vehicle light system to comply with varying local laws and desires of the vehicle operator. The invention provides users the option of daytime running lights and the option of invoking head and tail lights whenever the windshield wipers are active. The invention also provides the user with the option of automatically turning off either or both the head and tail/park lights when the ignition switch is turned off

2. State of the Art

Many circuits and devices exist which control a vehicle light system. However, since none of these devices provide a means to be programmed to alter the configuration of the circuit or device, the operator is denied the versatility required.

There exist circuits and devices which create daytime running lights by illuminating the low beam headlights, at either full voltage or at a reduced voltage (as described in U.S. Pat. No. 5,030,884 issued to Roussey in July, 1991), whenever the ignition switch is on and the head and tail/park light switch is off. However, none of these circuits may be programmed to deactivate the daytime running lights with means to alert the operator that the daytime running lights have been deactivated.

Deactivation of daytime running lights allows the vehicle operator to idle the vehicle while parked without running lights. Deactivation is automatic when parked with the circuit of U.S. Pat. No. 4,928,036 (issued to Abboud in May of 1990). Manual deactivation of daytime running lights may also be desirable to adapt the vehicle for operation in jurisdictions that do not require running lights.

There are also devices which automatically turn on the head and tail/park lights whenever the windshield wipers are activated. Such a device is described in U.S. Pat. No. 4,985,660, issued to Croak in January 1991. However, this circuit may not be programmed to disable activation of the head and tail/park lights with operation of the windshield wipers.

Disabling activation of headlights and tail/park lights with windshield wipers lets the vehicle operator idle or run the vehicle, with operating windshield wipers, and without head and tail/park lights in jurisdictions that allow windshield wipers without lights or in surveillance situations.

There also exist several circuits which automatically turn off the head and tail/park lights when turning off the ignition switch. Additional circuits, such as that described in U.S. Pat. No. 4,965,461, issued to McRoberts in October, 1990, turn off the headlights a preset time after the ignition switch is turned off. However, none of these circuits and devices may be programmed to maintain either both the head and tail/park lights or only the tail/park lights on with the ignition switch off. Furthermore, none of these circuits visually indicate the state of the head or tail/park lights.

The previous ignition controlled headlight control circuits will not keep either both the head and tail/park lights or only the tail/park lights on until a circuit which monitors the battery voltage detects a low battery voltage. Automatically extinguishing lights before the battery discharges below the charge required to start the vehicle helps avoid towing fees.

SUMMARY OF THE INVENTION

The invention is a programmable apparatus which may implement various configurations of the vehicle light system to comply with local laws and the desires of the vehicle operator. The apparatus may be tied into the light circuits of a vehicle and programmed to give daytime running lights by illuminating the low beam headlights at full voltage whenever the ignition switch is on, and the head and tail/park light switch is off. The lights operate conventionally when lights are energized by turning the light switch on, or the head and tail/park lights are energized by operation of the windshield wipers. The apparatus may be programmed to deactivate the daytime running lights.

The apparatus may be programmed to turn on the head and tail/park lights whenever the windshield wipers are active if the user so desires. The apparatus provides a means to deactivate the headlights while the tail/park lights remain energized. When the head and tail/park lights are activated by operation of the windshield wipers, the lights remain on until the ignition switch is turned off. This prevents the operator from inadvertently turning off the lights when the windshield wipers are no longer required, and allows for intermittent operation of the windshield wipers.

The apparatus is programmable to turn off either both the head and tail/park lights or only the headlights when the ignition switch is turned off even if the head and tail/park light switch is full on. This limits inadvertent discharge of the battery should the operator fail to turn off the lights. If the apparatus is programmed to maintain either both the head and tail/park lights or only the tail/park lights on while the ignition switch is off, the apparatus monitors the battery voltage and automatically kills the lights before the battery discharges to the level where the vehicle would fail to start.

The apparatus may be built with discrete logic, programmable logic devices, gate arrays, or a microprocessor having program memory, an input and output port, and address decoding circuitry.

The light control apparatus also visually indicates the state of the daytime running lights, headlights, and tail/park lights so that the vehicle operator can check that the vehicle is properly lighted.

Another embodiment of the invention has an ambient light level sensor, and automatically turns the lights on when the vehicle is operated at night. Still another embodiment has an internal clock, and also turns the lights on automatically when the vehicle is operated at night.

The light control apparatus is designed to be integrated into the vehicle light system of new production vehicles or into the lighting system of existing vehicles.

BRIEF DESCRIPTION OF THE DRAWINGS

The best mode presently contemplated for carrying out the invention is illustrated in the accompanying drawings, in which.

DETAILED DESCRIPTION OF THE ILLUSTRATED EMBODIMENTS

The light control apparatus comprises a program module, and a light control module having three relays energized in combination with the program module. The program module is placed for immediate access by the operator and comprises S4, S5, S6, S7, D3, D5, and D7 of the circuit diagrams of the preferred embodiment of FIGS. 1 and of the alternative embodiment of FIG. 3.

The light control apparatus may either be built into the light system of new production vehicles or added to the light system of existing vehicles. This discussion will discuss the system as a retrofit because this will most efficiently express the difference between the present invention and prior art.

Figure 2A:
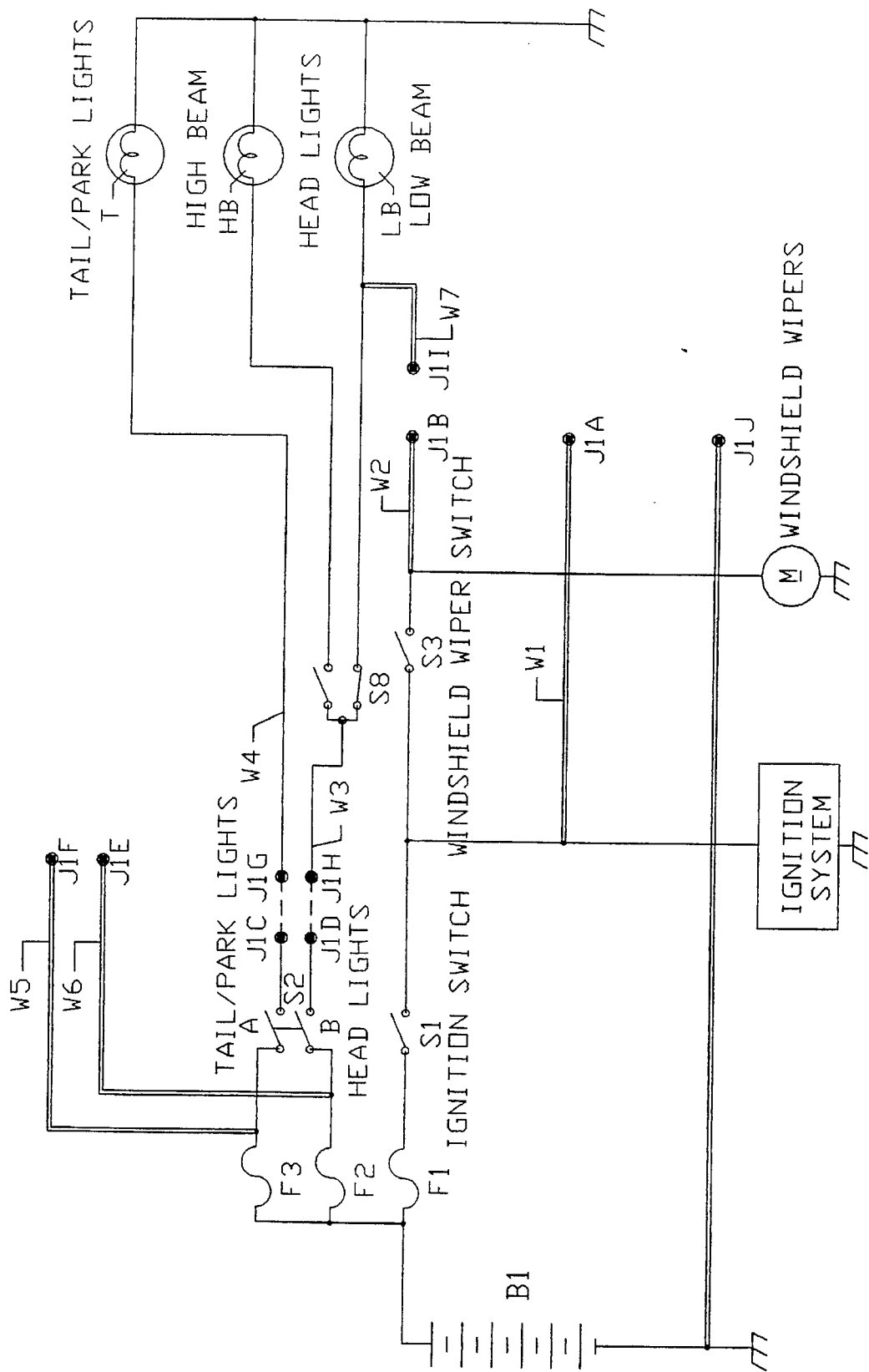
FIG. 2A, a schematic of a typical vehicle electrical system showing the connections required for the light control apparatus.

In a typical conventional vehicle lighting system, such as that shown in FIG. 2A, a twelve-volt battery B1 feeds a set of fuses F1, F2, and F3. Power from fuse F1 connects through an ignition switch S1 to the ignition system of the vehicle, while power from the second fuse F2 connects through the headlight side S2B of a head and tail/park light switch S2 to a dimmer switch S8. The dimmer switch S8 in turn powers the high beam lights HB and the low beam lights LB. Similarly, power from a third fuse F3 connects through a tail/park side S2A of the head and tail/park light switch S2 to the tail and parking lights T. Additional circuitry (not shown) handles braking and signalling lights.

The light control module of the present invention is connected to the system of FIG. 2A by adding a wire W1 to connect the ignition switch power to a first pin J1A of a ten-pin connector J1. Similarly, a wire W2 is added to connect windshield wiper power to a second pin J1B of the connector, wire W3 connecting the headlight power from the light switch S2 to the dimmer switch is cut and each end of the wire is connected to a pin J1D and J1H of the connector, wire W4 connecting the tail/park power from the light switch S2 to the tail and parking lights is cut and each end of the wire is connected to a pin J1C and J1G of the connector, a wire W5 is added from the tail/park light fuse F3 to a pin J1F of the connector, a wire W6 is added from the headlight fuse F2 to a pin J1E of the connector, a wire W7 is added from the low beam side of the dimmer switch to a pin J1I of the connector, and a wire J1J is added from a pin J1J of the connector to ground. The light control module, with attached program module, is then attached to the connector to form the vehicle lighting circuit of FIG. 2B, FIG. 1, or FIG. 3.

Figure 1:
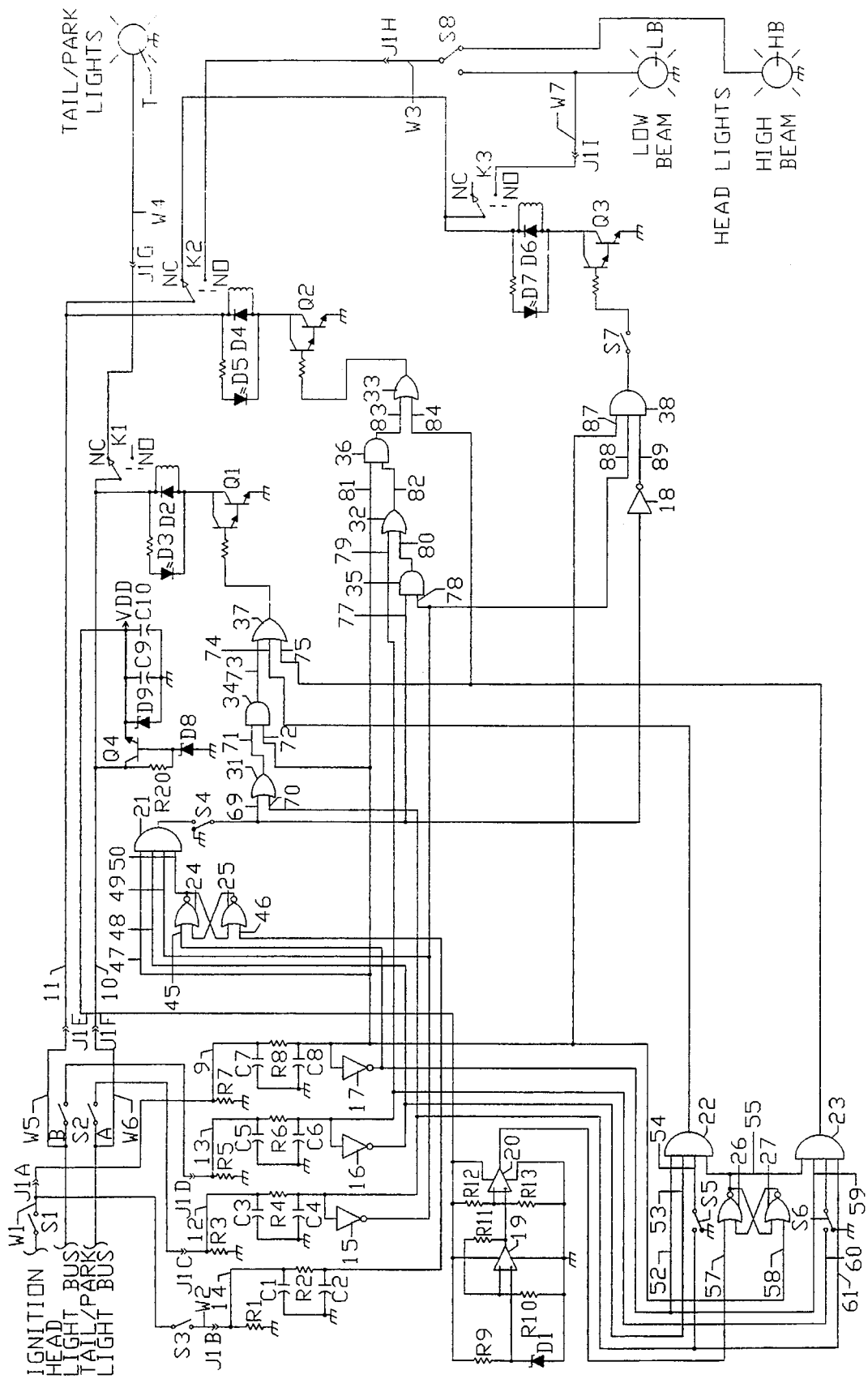
FIG. 1 is a circuit diagram of the light control apparatus and program module of the preferred embodiment of the invention, with some portions of the vehicle lighting system.
Figure 2B:
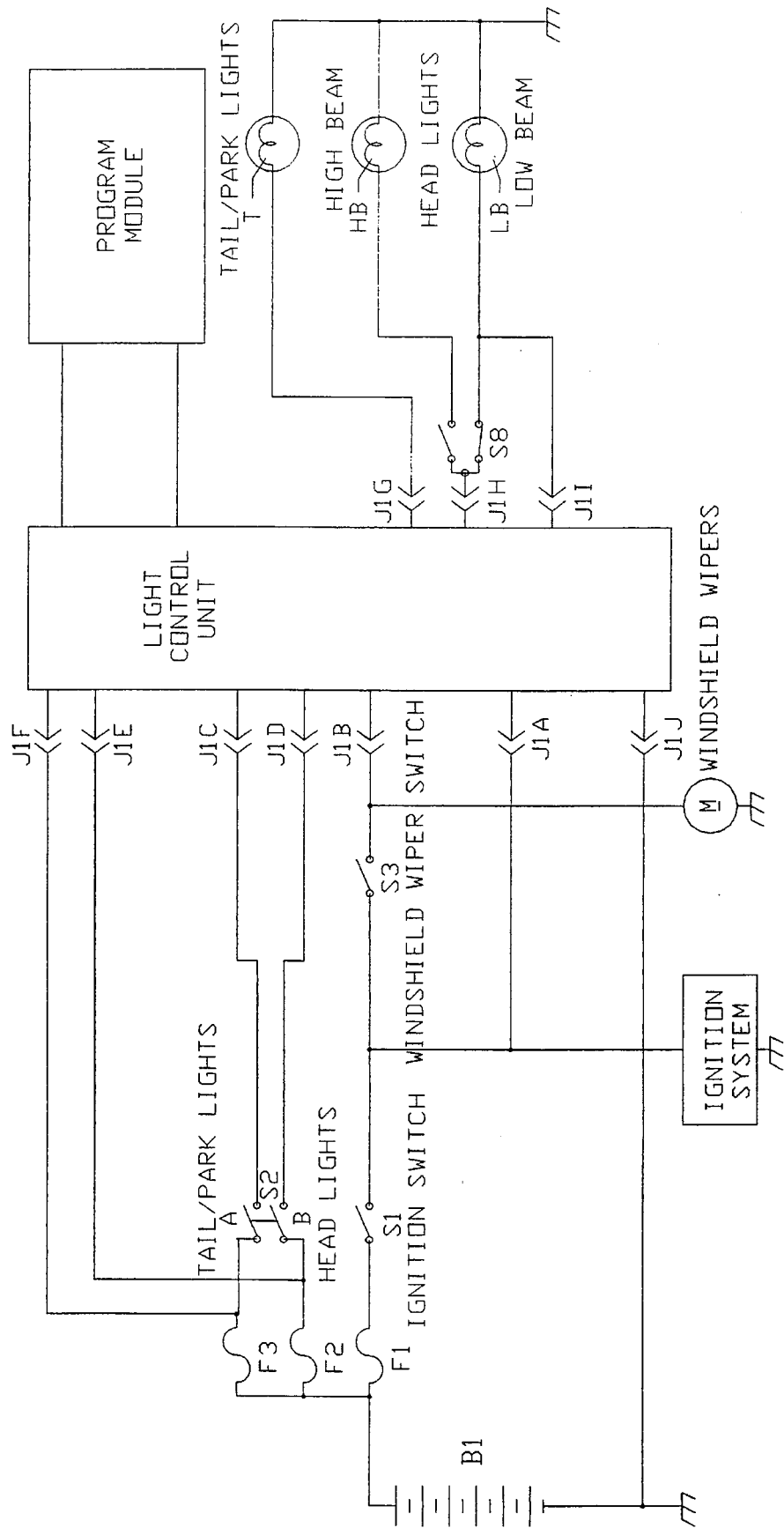
FIG. 2B, a schematic of a vehicle electrical system incorporating the present invention.
Figure 3:
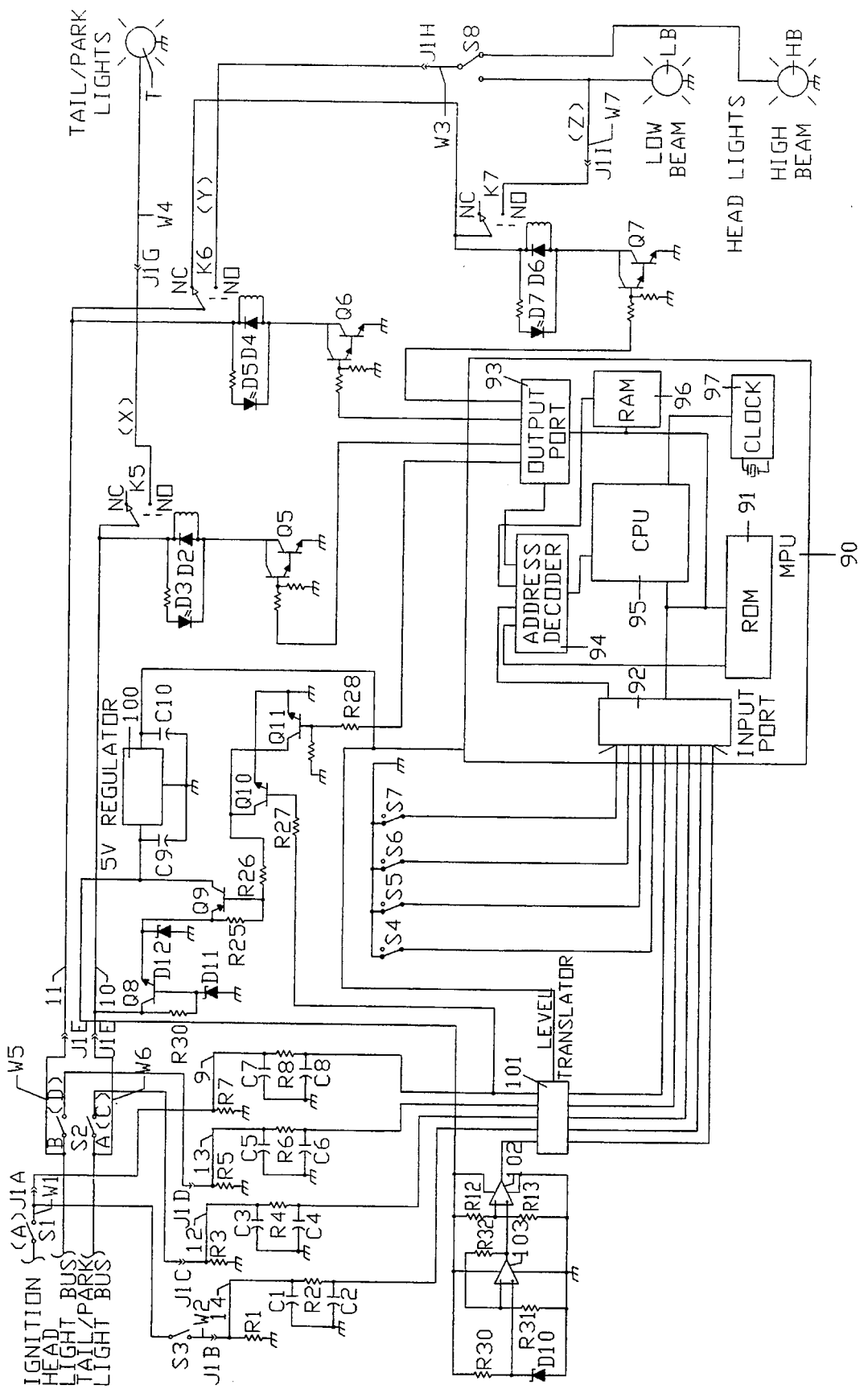
FIG. 3, a circuit diagram of the light control apparatus and the program module of the alternative embodiment of the invention implemented with a microprocessor unit, with some portions of the vehicle lighting system.

The light control module has those components of the vehicle lighting system of FIG. 1, or the alternative embodiment of FIG. 3, that are not part of the typical vehicle lighting system of FIG. 2A and are not part of the program module. Included among these components are three relays, K1, K2, and K3 of the preferred embodiment of FIG. 1, or K5, K6, and K7 of the alternative embodiment of FIG. 3, with circuitry for activating the relays.

When the vehicle light control module is installed as shown, the first relay K1 & K5, which activates the tail/park lights, is connected in the system with its contacts parallel to the head and tail/park light switch and in series with the tail/park lights. The second relay K2 & K6, which activates the headlights, is connected in the system with its contacts in parallel with the head and tail/park light switch, and in series with the headlight dimmer switch and the headlights. The third relay K3 & K7, which implement the daytime running lights, is connected in the system with its contacts in parallel with the head and tail/park light switch, the headlight dimmer switch, and in series with the low beam headlights.

With the preferred embodiment (FIG. 1), the normally closed contacts of single pole, double throw relay K1 are in parallel with the tail/park side S2A of head and tail/park light switch S2 and in series with the tail/park lights while the normally open contacts are not connected. The normally open contacts of single pole, double throw relay K2 are in parallel with the head and tail/park light switch S2B and in series with the dimmer switch S8 and the headlights, while the normally closed contacts are in series with the coil and contacts of K3 and Q3. The normally open contacts of single pole, double throw relay K3 are in parallel with the headlight side S2B of the head and tail/park light switch S2, the headlight dimmer switch S8, and in series with the normally closed contacts of relay K2 and the low beam headlights while the normally closed contacts of relay K3 are not connected.

The tail/park light bus 10 (FIG. 1) is connected ahead of the vehicle tail/park light switch S2A and powers relay K1 and, through an overvoltage protection circuit formed by transistor Q4, resistor R20, and Zener diode D8, as the power source for Inverters 15, 16, 17, and 18, Operational Amplifiers 19 and 20, Zener Diode D1, the four input AND gates 21, 22, and 23, the two input NOR gates 24, 25, 26, and 27, the two input OR gates 31, 32, and 33, the two input AND gates 34, 35, and 36, the three input OR gate 37, and the three input AND gate 38. Voltage surges present on the other inputs to the module are current limited by the protection network resistors R2, R4, R6 and R8, and bypassed to the overvoltage-protected power source by parasitic protection diodes integrated with the CMOS logic gates used in this design. Excess current from resistors R2, R4, R6 and R8 on the overvoltage-protected power source is bypassed to ground through Zener diode D9.

The tail-park bus also serves as the battery reference voltage across the voltage divider network R12 and R13 of FIG. 1. The headlight bus 11 is connected ahead of the vehicle headlight switch S2B and powers Relays K2 and K3.

The ignition bus 9 of FIG. 1 is connected after the vehicle ignition switch S1 and is an input signal to Inverter 17, NOR gate 27, and AND gates 21, 34, 36, and 38. Headlight bus 13 of FIG. 1 is connected after the vehicle headlight switch S2B and is an input signal to Inverter 16, AND gate 23, and OR gate 32. Tail/park light bus 12 of FIG. 1 is connected after the vehicle tail/park light switch S2A and is an input signal to Inverter 15, AND gates 22 and 23, and OR gate 31. The windshield wiper bus 14 of FIG. 1 is connected after the vehicle windshield wiper switch S3 and is an input signal to gate NOR 25.

NOR gates 24, 25, 26, and 27 serve as SET-RESET (S-R) latches. The S-R latch comprising NOR gates 24 and 25 is initially latched reset when the ignition switch is turned off. When the ignition switch is off, a high from Inverter 17 on input 45 of gate 24 and a low from the windshield wiper switch on input 46 of gate 25 resets the S-R latch (since the ignition switch is the power source for the windshield wiper switch, the windshield wiper switch provides a low level when the ignition switch is off) giving a low on the output of gate 24. When the ignition switch is on and the windshield wiper switch is off, a low from Inverter 17 on input 45 of gate 24 and a low from the windshield wiper switch on input 46 of gate 25 maintains the S-R latch reset state giving a low on the output of gate 24. When the windshield wiper switch is on and the ignition switch is also on, a low from the Inverter 17 on input 45 of gate 24 and a high from the windshield wiper switch on input 46 of gate 25 sets the S-R latch giving a high on the output of gate 24. When the windshield wiper switch is off and the ignition switch is on, a low from Inverter 17 on input 45 of gate 24 and a low from the windshield wiper switch on input 46 of gate 25 maintains the S-R latch set giving a high on the output of gate 24.

The remaining latch, comprised of NOR gates 26 and 27, is initially SET when the ignition switch is turned on. When the ignition switch is on and the output of Operational Amplifier 20 is low, a high from the ignition switch on input 58 of gate 27 and a low from Operational Amplifier 20 on input 57 of gate 26 sets the S-R latch giving a high on the output of gate 26. When the ignition switch is off and the output of Operational Amplifier 20 is low, a low from the ignition switch on input 58 of gate 27 and a low from Operational Amplifier 20 on input 57 of gate 26 maintains the S-R latch set giving a high on the output of gate 26. When a low to high transition of Operational Amplifier 20 occurs with the ignition switch off, a low from the ignition switch on input 58 of gate 27 and a high from Operational Amplifier 20 on input 57 of gate 26 resets the S-R latch giving a low on the output of gate 26. When the ignition switch is turned on and the output of Operational Amplifier 20 is high, a high from the ignition switch on input 58 of gate 27 and a high from Operational Amplifier 20 on input 57 of gate 26 resets the S-R latch giving a low on the output of gate 26.

Operational Amplifier 19, with D1, R9, R10, and R11, serves as a voltage reference network. The reference voltage from Operational amplifier 19 is connected at the noninverting input of Operational amplifier 20 which is a voltage comparator. The voltage comparator compares the battery voltage to the reference voltage, and if the battery voltage is greater than the reference voltage then the output of Operational amplifier 20 is a low. If the battery voltage is less than the reference voltage then the output of Operational amplifier 20 is high. The value of the reference voltage is established at a level that is greater than the minimum battery voltage required to start the vehicle.

Resistors R1, R3, R5, and R7 define a low at the inputs of Inverters 15, 16, 17, and 18, AND gates 21, 22, 23, 34, 35, 36, and 38, NOR gates 24, 25, 26, and 27, and OR gates 31, 32, 33, and 37 when the ignition switch S1, the tail/park light switch S2A, the headlight switch S2B, or the windshield wiper switch S3 are off. The resistor capacitor networks of R2, C1, C2, R4, C3, C4, R6, C5, C6, and R8, C7, C8 protect the logic inputs from transients.

In the initial state S1, S2A, S2B, and S3 of the vehicle electrical system and S5 and S6 of the program module are open, while S4 and S7 of the program module are closed. The S-R latch comprising NOR gates 24 and 25 is reset giving a low at the output of gate 24, while the S-R latch comprising NOR gates 26 and 27 is set giving a high at the output of gate 26. Also, in the initial state the battery is assumed to be fully charged giving a low at the output of Operational amplifier 20. The initial state results in a low at the inputs of Inverters 15, 16, and 17 and a high at the outputs. The initial state also results in a low at inputs 46, 47, 54, 58, 60, 61, 70, 72, 79, 81, and 87 of gates 21, 22, 23, 25, 27, 31, 32, 34, 36, and 38, a high from Inverters 15, 16, and 17 at inputs 48, 49, 52, 53, 59, 45, 78, and 88 of gates 21, 21, 22, 22, 23, 24, 35, and 38, and a low at the input of Inverter 18. This combination results in a high at the output of Inverter 18 which feeds input 89 of gate 38, and a low at the outputs of gates 21, 22, 23, 31, 32, 33, 34, 35, 36, 37, and 38. With a low at the outputs of gates 37, 33, and 38 transistors Q1, Q2, and Q3, in series with D3, D5, D7, and the coils of K1, K2, and K3, are cutoff. With transistors Q1, Q2, and Q3 in cutoff, tail/park light, headlight, and daytime running light indicators D3, D5, and D7 are off, the coils of relay K1, K2, and K3 are off and K1, K2, and K3 are open. With the contacts of K1, K2, and K3 open, the daytime running lights (low beam headlights), the tail/park lights, and the headlights are all off.

In the second state S1, S2B, and S3 of the vehicle electrical system and S5 and S6 of the program module are open, while S2A, the tail/park light switch of the vehicle electrical system and S4 and S7 of the program module are closed. The S-R latch, comprising NOR gates 24 and 25, is reset giving a low at the output of gate 24, while the S-R latch, comprising NOR gates 26 and 27 is set giving a high at gate 26. Also, in the second state the battery is assumed to be fully charged giving a low at the output of Operational amplifier 20. The second state results in a low at the inputs of Inverters 16 and 17, a high at the input of Inverter 15, a high at the outputs of Inverters 16 and 17, and a low at the output of Inverter 15. The second state also results in a low at inputs 47, 60, 46, 58, 79, 72, 81, and 87 of gates 21, 23, 25, 27, 32, 34, 36, and 38, a high at inputs 61 and 70 of gates 23 and 31, a high from Inverters 16 and 17 at inputs 48, 52, 53, 59, and 45 of gates 21, 22, 23, and 24, a low from Inverter 15 at inputs 49, 78, and 88 of gates 21, 35, and 38, and a low at the input of Inverter 18. This gives a high at the output of Inverter 18 which is connected to the input of gate 38, a low at the outputs of gates 21, 22, 23, 32, 33, 34, 35, 36, 37, and 38, and a high at the output of gate 31. With a low at the outputs of gates 37, 33, and 38, transistors Q1, Q2, and Q3, which are in series with D3, D5, D7, and the coils of K1, K2, and K3 are cutoff. With transistors Q1, Q2, and Q3 in the cutoff the tail/park light, headlight, and daytime running light indicators D3, D5, and D7 are off while the coils of relay K1, K2, and K3 are not energized and K1, K2, and K3 are open. With K1, K2, and K3 open the daytime running lights (low beam headlights), the tail/park lights, and the headlights are all off. However, if the controller is programmed to activate the tail/park lights via S5 of the program module we have a high at input 54 of gate 22. A high at inputs 52, 53, 54, 55 of gate 22, the set S-R latch, comprising NOR gates 26 and 27, results in a high at the outputs of gates 22 and 37. A high at the output of gate 37 transistor Q1, in series with D3, and the coil of K1, is in saturation. With transistor Q1 in saturation the visual tail/park light indicator D3 is on while the coil of relay K1 is energized and the contacts of K1 are closed. With the contacts of K1 closed the tail/park lights are on. As the battery gradually discharges, the battery voltage, at the inverting input of Operational amplifier 20, droops below the reference voltage at the noninverting input of Operational amplifier 20. When the battery voltage is less than the reference voltage, a low to high transition occurs at the output of Operational amplifier 20. This low to high transition resets the S-R latch, comprising NOR gates 26 and 27, giving a low at the output of gate 26. A low at input 55 of gate 22 results in a low at the outputs of gates 22 and 37. With a low at the output of gate 37 transistor Q1, in series with D3, and the coil of K1, is cutoff. With transistor Q1 cutoff the tail/park light indicator D3 is off while the coil of relay K1 is not energized and K1 opens. With K1 open the tail/park lights are off.

In the third state S1 and S3 of the vehicle electrical system and S5 and S6 of the program module are open, while tail/park light switch S2A and the headlight switch S2B of the vehicle electrical system and S4 and S7 of the program module are closed. The S-R latch, comprising NOR gates 24 and 25, is reset giving a low at the output of gate 24, while the S-R latch, comprising NOR gates 26 and 27, is set giving a high at the output of gate 26. Also, in the third state the battery is assumed to be fully charged giving a low at the output of Operational amplifier 20. The third state results in a low at the input of Inverter 17, a high at the inputs of Inverters 15 and 16, a high at the output of Inverter 17, and a low at the outputs of Inverters 15 and 16. The third state also results in a low at inputs 47, 46, 58, 72, 81, and 87 of gates 21, 25, 27, 34, 36, and 38, a high at inputs 54, 61, 70, and 79 of gates 22, 23, 31 and 32, a high from Inverter 17 at inputs 52, 59, and 45 of gates 22, 23, and 24, a low from Inverters 15 and 16 at inputs 48, 49, 53, 78, and 88, of gates 21, 21, 22, 35, and 38, and a low at the input of Inverter 18. This results in a high at the output of Inverter 18 connected to the input of gate 38, a low at the outputs gates 21, 22, 23, 33, 34, 35, 36, 37, and 38, and a high at the outputs of gates 31 and 32. With a low at the outputs of gates 37, 33, and 38 transistors Q1, Q2, and Q3, in series with D3, D5, and D7 and the coils of K1, K2, and K3, are cutoff. With transistors Q1, Q2, and Q3 cutoff the visual tail/park light, headlight, and daytime running light indicator D3, D5, and D7 are off while the coils of relay K1, K2, and K3 are not energized and K1, K2, and K3 are open. With the contacts of K1, K2, and K3 open the daytime running lights (low beam headlights), the tail/park lights, and the headlights are all off. If the controller has been programmed to activate both the head and tail/park lights via S6 of the program module this gives a high at input 60 of gate 23. A high at inputs 59, 60, 61 of gate 23 and from the set S-R latch, (NOR gate 26 and 27), gives a high at the outputs of gates 23, 33 and 37. A high at the outputs of gates 33 and 37 transistors Q1 and Q2, in series with D3, D5, D7, and the coils of K1 and K2, are in the saturation state. With transistors Q1 and Q2 in saturation the tail/park light and headlight indicators D3 and D5 are on while the coils of relays K1 and K2 are energized and the contacts of K1 and K2 are closed. With the contacts of K1 and K2 closed both the head and tail/park lights are on. As the battery gradually discharges however, the battery voltage, which is connected at the inverting input of Operational amplifier 20, becomes less than the reference voltage on the noninverting input of Operational amplifier 20. When the battery voltage is less than the reference voltage, a low to high transition occurs at the output of Operational amplifier 20. This low to high transition, from Operational amplifier 20, resets the S-R latch, comprising NOR gates 26 and 27, giving a low at the output 55 of gate 26. A low at input 55 of gate 23 results in a low at the outputs of gates 23, 33, and 37. With a low at the outputs of gate 33 and 37 transistors Q1 and Q2, in series with D3, D5, and the coils of K1 and K2, are cutoff. With transistors Q1 and Q2 cutoff the tail/park light and headlight indicators D3 and D5 are off while the coils of relays K1 and K2 are off and the contacts of K1 and K2 are open. With K1 and K2 open both the head and tail/park lights are off.

In the fourth state S1, S2A, and S2B of the vehicle electrical system and S5 and S6 of the program module are open, while S3 the windshield wiper switch of the vehicle electrical system and S4 and S7 of the program module are closed. Since the ignition switch powers the windshield wiper switch, the windshield wiper signal 14 also is low. The S-R latch, comprising NOR gates 24 and 25, is reset giving a low at the output of gate 24, while the S-R latch, comprising NOR gates 26 and 27, is set giving a high at the output of gate 26. Also, in the fourth state the battery is assumed to be fully charged giving a low at the output of Operational amplifier 20. The fourth state results in a low at inputs 39, 41, and 43 of Inverters 15, 16, and 17 and a high at the outputs of Inverters 15, 16, and 17. The fourth state also results in a low at inputs 46, 47, 54, 58, 60, 61, 70 of gates 21, 22, 23, 25, 27, 31, 32, 34, 36, and 38, a high from the outputs of Inverters 15, 16, and 17 at inputs 48, 49, 52, 53, 59, 45, 78, and 88 of gates 21, 22, 23, 24, 35, and 38, and a low at the input of Inverter 18. This results in a high at the output of Inverter 18, feeding an input of gate 38, and a low at the outputs of gates 21, 22, 23, 31, 32, 33, 34, 35, 36, 37, and 38. With a low at the outputs of gates 37, 33, and 38 transistors Q1, Q2, and Q3, in series with D3, D5, D7, and the coils of K1, K2, and K3, are cutoff. With transistors Q1, Q2, and Q3 cutoff the tail/park light, headlight, and daytime running light indicators D3, D5, and D7 are off while the coils of relay K1, K2, and K3 are not energized and the contacts of K1, K2, and K3 are open. With the contacts of K1, K2, and K3 open the daytime running lights (low beam headlights), tail/park lights, and headlights are all off.

In the fifth state the ignition switch S1 and the headlight switch S2B of the vehicle electrical system and S5 and S6 of the program module are open, while the tail/park light switch S2A and the windshield wiper switch S3 of the vehicle electrical system and S4 and S7 of the program module are closed. Since the ignition switch powers the windshield wiper switch, the windshield wiper signal 14 is low. The S-R latch, comprising NOR gates 24 and 25, is reset giving a low at the output of gate 24, while the S-R latch, comprising NOR gates 26 and 27, is set giving a high at the output of gate 26. Also, in the fifth state the battery is assumed to be fully charged giving a low at the output of Operational amplifier 20. The fifth state results in a low at the inputs Inverters 16 and 17, a high at the input of Inverter 15, a high at the outputs of Inverters 16 and 17, and a low at the output of Inverter 15 at 40. The fifth state also results in a low at inputs 47, 60, 46, 58, 79, 72, 81, and 87 of gates 21, 23, 25, 27, 32, 34, 36, and 38, a high at inputs 61 and 70 of gates 23 and 31, a high from the outputs of Inverters 16 and 17 at inputs 48, 52, 53, 59, and 45 of gates 21, 22, 23, and 24, a low from Inverter 15 at inputs 49, 78, and 88 of gates 21, 35, and 38, and a low at the input of Inverter 18. This results in a high at the output of Inverter 18 which feeds the input of gate 38, a low at the outputs of gates 21, 22, 23, 32, 33, 34, 35, 36, 37, and 38, and a high at the output of gate 31. With a low at the outputs of gates 37, 33, and 38 transistors Q1, Q2, and Q3, in series with D3, D5, D7, and the coils of K1, K2, and K3 are cutoff. With transistors Q1, Q2, and Q3 cutoff the tail/park light, headlight, and daytime running light indicators D3, D5, and D7 are off while the coils of relay K1, K2, and K3 are off and the contacts of K1, K2, and K3 are open. With the contacts of K1, K2, and K3 open the daytime running lights (low beam headlights), the tail/park lights, and the headlights are all off. If the controller has been programmed to activate the tail/park lights via S5 of the program module this results in a high at input 54 of gate 22. A high at inputs 52, 53, 54, and 55 of gate 22, and including the set S-R latch comprising NOR gates 26 and 27, gives a high at the outputs of gates 22 and 37. A high at the output of gate 37 transistor Q1, which is in series with D3, and the coil of K1, is in saturation. With transistor Q1 in saturation the visual tail/park light indicator D3 is on while the coil of relay K1 is energized and the contacts of K1 are closed. With the contacts of K1 closed the tail/park lights are on. As the battery gradually discharges, the battery voltage at the inverting input of Operational amplifier 20, becomes less than the reference voltage at the noninverting input of Operational amplifier 20. When the battery voltage is less than the reference voltage established at a level that is greater than the minimum battery voltage required to start the vehicle, a low to high transition occurs at the output of Operational amplifier 20. This high from Operational amplifier 20, resets the S-R latch comprising NOR gates 26 and 27, giving a low at NOR gate 26. A low at input 55 of gate 22 results in a low at the outputs of gates 22 and 37. With a low at the output of gate 37 transistor Q1, in series with D3, and the coil of K1, is cutoff. With transistor Q1 cutoff the visual tail/park light indicator D3 is off while coil of relay K1 is not energized and the contacts of K1 are open. With K1 open the tail/park lights are off.

In the sixth state S1 the ignition switch and S5 and S6 of the program module are open, while the tail/park light switch S2A, the headlight switch S2B, and the windshield wiper switch S3 of the vehicle electrical system and S4 and S7 of the program module are closed. Since the ignition switch powers the windshield wiper switch, the windshield wiper signal 14 is low. The S-R latch comprising NOR gates 24 and 25 is reset giving a low at the output of gate 24, while the S-R latch comprising NOR gates 26 and 27 is set giving a high at gate 26. Also, in the sixth state the battery is assumed fully charged giving a low at Operational amplifier 20. The sixth state results in a low at the input of Inverter 17, a high at the inputs of Inverters 15 and 16, a high at the output of Inverter 17, and a low at the outputs of Inverters 15 and 16. The sixth state also results in a low at inputs 47, 46, 58, 72, 81, and 87 of gates 21, 25, 27, 34, 36, and 38, a high at inputs 54, 61, 70 and 79 of gates 22, 23, 31 and 32, a high from output of Inverter 17 at the inputs of gates 22, 23, and 24, a low from the outputs of Inverters 15 and 16 at inputs 48, 49, 53, 78, and 88 of gates 21, 21, 22, 35, and 38, and a low at the input of Inverter 18. This results in a high at the output of Inverter 18 which feeds the input of gate 38, a low at the outputs of gates 21, 22, 23, 33, 34, 35, 36, 37, and 38, and a high at the output of gates 31 and 32. With a low at the outputs of gates 37, 33, and 38, transistors Q1, Q2, and Q3, in series with D3, D5, D7, and the coils of K1, K2, and K3, are cutoff. With transistors Q1, Q2, and Q3 cutoff the visual tail/park light, headlight, and daytime running light indicators D3, D5, and D7 are off while the coils of relay K1, K2, and K3 are not energized and K1, K2, and K3 are open. With K1, K2, and K3 open the daytime running lights (low beam headlights), the tail/park lights, and the headlights are all off. If the controller has been programmed to activate both the head and tail/park lights via S6 of the program module this results in a high at the input 60 of gate 23. A high at inputs 59, 60, 61 of gate 23, and from the set S-R latch comprising NOR gate 26 and 27, results in a high at the outputs of gates 23, 33 and 37. With a high at the outputs of gates 33 and 37 transistors Q1 and Q2, in series with D3, D5, and the coils of K1 and K2, are saturated. With transistors Q1 and Q2 in saturation the visual tail/park light and headlight indicators D3 and D5 are on while the coils of relays K1 and K2 are energized and the contacts of K1 and K2 are closed. With the contacts of K1 and K2 closed both the head and tail/park lights are on. As the battery gradually discharges, the scaled battery voltage at the inverting input of Operational amplifier 20, becomes than the reference voltage at the noninverting input of Operational amplifier 20. When the battery voltage is less than the reference voltage, a high appears at the output of Operational amplifier 20. This high from Operational amplifier 20, resets the S-R latch comprising NOR gates 26 and 27, giving a low at the output of NOR gate 26. A low at input 55 of gate 23 results in a low at the outputs of gates 23, 33, and 37. With a low at the outputs of gate 33 and 37 transistors Q1 and Q2, in series with D3, D5, and the coils of K1 and K2, are cutoff. With transistors Q1 and Q2 cutoff the visual tail/park light and headlight indicators D3 and D5 are off while the coils of relays K1 and K2 are off and K1 and K2 are open. With the contacts of K1 and K2 open both the head and tail/park lights are off.

In the seventh state the tail/park light switch S2B, the headlight switch S2A, and wiper switch S3 of the vehicle electrical system and S5 and S6 of the program module are open, while the ignition switch S1 of the vehicle electrical system and S4 and S7 of the program module are closed. The S-R latch comprising NOR gates 24 and 25 is reset giving a low at the output of gate 24, while the S-R latch comprising NOR gates 26 and 27 is set giving a high at the output of gate 26. Also, in the seventh state the battery is assumed to be fully charged giving a low at Operational amplifier 20. The seventh state results in a low at the inputs of Inverters 15 and 16, a high at the input of Inverter 17, a high at the outputs of Inverters 15 and 16, and a low at the output of Inverter 17. The seventh state also results in a low at inputs 53, 61, 70, and 79 of gates 22, 23, 31, and 32, a high at inputs 47, 58, 81, and 87 of gates 21, 27, 36, and 38, a high from the outputs of Inverters 15 and 16 at inputs 58, 49, 53, 78, and 88 of gates 21, 21, 22, 35, and 38, a low from Inverter 17 at inputs 52, 59, and 45 of gates 22, 23, and 24, and a low at the input of Inverter 18. This results in a high at Inverter 18 which is connected to input 89 of gate 38, and a low at the outputs of gates 21, 22, 23, 31, 32, 33, 34, 35, 36, and 37, and a high at the output of gate 38. With a low at the outputs of gates 37, and 33, transistors Q1 and Q2, in series with D3, D5, and the coils of K1 and K2, are cutoff. With transistors Q1, and Q2 cutoff the visual tail/park light and headlight indicators D3 and D5 are off while the coils of relay K1 and K2 are off and K1 and K2 are open. With the contacts of K1 and K2 open the tail/park lights and the headlights are off. With a high at the output of gate 38 transistor Q3, which is in series with D7, the normally closed contacts of K2, and the coil of K3, is in saturation. With transistor Q3 in saturation the visual daytime running light indicator D7 is on while the coil of relay K3 is energized, through the normally closed contacts of K2, and the contacts, which are in series with the normally closed contacts of K2, are closed. With K3 closed the running lights (low beam headlights) are on. If the controller has been programmed to deactivate the daytime running lights via S7 there is a low at the output of gate 38. With a low at the output of gate 38 transistor Q3, in series with D7, the normally open contacts of K2, and the coil of K3, is cutoff. With transistor Q3 cutoff the visual daytime running light indicator D7 is off while the coil of relay K3 is off, the normally open contacts, in series with the normally closed contacts of K2, are open. With K3 open the daytime running lights are off.

In the eighth state the tail/park light switch S2B and the windshield wiper switch S3 of the vehicle electrical system and S5 and S6 of the program module are open, while ignition switch S1 and the tail/park light switch S2A of the vehicle electrical system and S4 and S7 of the program module are closed. The S-R latch comprising NOR gates 24 and 25, is reset giving a low at the output of gate 24, while the S-R latch comprising NOR gates 26 and 27 is set giving a high at the output of gate 26. Also, in the eighth state the battery is assumed to be fully charged giving a low at Operational amplifier 20. The eighth state results in a low at the input of Inverter 16, a high at the inputs of Inverters 15 and 17, a high at the output of Inverter 16, and a low at the outputs of Inverters 15 and 17. The eighth state also results in a low at inputs 46 and 79 of gates 25 and 32 at 46 and 79, a high at inputs 47, 61, 58, 70, 72, 81, and 87 of gates 21, 23, 27, 31, 34, 36, and 38, a high from Inverter 16 at inputs 48 and 58 of gates 21 and 22, a low from the outputs of Inverters 15 and 17 at inputs 49, 52, 59, 45, 78, and 88 of gates 21, 22, 23, 24, 35, and 38, and a low at the input of Inverter 18. This results in a high at the output of Inverter 18 which is connected to input 89 of gate 38, a low at the outputs of gates 21, 22, 23, 32, 33, 35, 36, and 37, and a high at the outputs of gates 31, 34, and 37. With a low at the outputs of gates 33, and 38 transistors Q2 and Q3, in series with D5, D7, and the coils of K2 and K3, are cutoff. With transistors Q2 and Q3 cutoff the visual headlight and daytime running light indicators D5 and D7 are off while the coils of relay K2 and K3 are off and the contacts of K2 and K3 are open. With the contacts of K2 and K3 open both the daytime running lights and the headlights are off. With a high at the output of gate 37 transistor Q1, in series with D3, and the coil of K1, is in saturation. With transistor Q1 saturated the visual tail/park light indicator D3 is on while the coil of relay K1 is energized and K1 is closed. With the contacts of K1 closed the tail/park lights are on.

In the ninth state the windshield wiper switch S3 of the vehicle electrical system and S5 and S6 of the program module are open, while the ignition switch S1, the tail/park light switch S2A, and the headlight switch S2B of the vehicle electrical system and S4 and S7 of the program module are closed. The S-R latch comprising NOR gates 24 and 25, is reset giving a low at the output of gate 24, while the S-R latch, comprising NOR gates 26 and 27 is set giving a high at the output of gate 26. Also, in the eighth state the battery is assumed to be fully charged giving a low at the output of Operational amplifier 20. The ninth state results in a high at the inputs of Inverters 15, 16, and 17 and a low at the outputs of Inverters 15, 16, and 17. The ninth state also results in a low at input 46 of gates 25, a high at inputs 47, 61, 58, 70, 79, 72, 81, and 87 of gates 21, 23, 27, 31, 32, 34, 36, and 38, a low from Inverters 15, 16 and 17 at inputs 48, 49, 52, 53, 59, 45, 78, and 88 of gates 21, 22, 23, 24, 35, and 38, and a low at the input of Inverter 18. This results in a high at the output of Inverter 18 which is connected to input 89 of gate 38, a low at the outputs of gates 21, 22, 23, 35, and 38, and a high at the outputs of gates 31, 32, 33, 34, 36, and 37. With a low at the output of gate 38 transistor Q3, in series with D7, and the coil of K3, is cutoff. With transistor Q3 cutoff the visual daytime running light indicator D7 is off while the coil of relay K3 is off and K3 is open. With K3 open the daytime running lights are off. With a high at the output of gates 33 and 37 transistors Q1 and Q2, in series D3, D5, and the coils of K1 and K2, are saturated. With transistors Q1 and Q2 saturated the tail/park light and headlight indicators D3 and D5 are on while the coils of relays K1 and K2 are on and the normally open contacts of K1 and K2 are closed. With the normally open contacts of K1 and K2 closed both the tail/park lights and the headlights are on.

In the tenth state the tail/park light switch S2A and the headlight switch S2B of the vehicle electrical system and S5 and S6 of the program module are open, while the ignition switch S1 and the windshield wiper switch S3 of the vehicle electrical system and S4 and S7 of the program module are closed. The S-R latch comprising NOR gates 24 and 25 is reset giving a low at the output of gate 24, while the S-R latch comprising NOR gates 26 and 27 is set giving a high at the output of gate 26. Also, in the tenth state the battery is assumed to be fully charged giving a low at the output of Operational amplifier 20. The tenth state results in a low at the input of INVERTERS 15 and 16, a high at the input of Inverter 17, a high at the outputs of Inverters 15 and 16, and a low at the output of Inverter 17. The tenth state also results in a low at inputs 61, 70, and 79 of gates 23, 31, and 32, a high at inputs 47, 46, 58, 72, 81, and 87 of gates 21, 25, 27, 34, 36, and 38, a high from the outputs of Inverters 15 and 16 at inputs 48, 49, 53, 78, and 88 of gates 21, 21, 22, 35, and 38, a low from Inverter 17 at the inputs of gates 22, 23, and 24 at 56, 59, and 45, and a high at the input of Inverter 18. This results a low from Inverter 17 on input 45 of gate 24 and a high from the windshield wiper switch on the input of gate 25. This sets the S-R latch comprising NOR gates 24 and 25, giving a high on the input of gate 21. This results in a low at the output of Inverter 18 which feeds input 89 of gate 38, a low at the outputs of gates 22, 23, and 38, and a high at the outputs of gates 31, 32, 33, 34, 35, 36, and 37. With a low at the output of gate 38 transistor Q3, which is in series with D7, and the coil of K3, is cutoff. With transistor Q3 cutoff the visual daytime running light indicator D7 is off while the coil of relay K3 is off and K3 is open. With K3 the daytime running lights are off. With a high at the outputs of gates 33 and 37 transistors Q1 and Q2, in series with D3, D5, and the coils of K1 and K2, are saturated. With Q1 and Q2 saturated the visual tail/park light and headlight indicators D3 and D5 are on while the coils of relays K1 and K2 are on and the normally open contacts of K1 and K2 are closed. With the normally open contacts of K1 and K2 closed the tail/park lights and the headlights are on. Turning the windshield wiper switch S3 off results in a high to low transition at input 46 of gate 25. The state of the S-R latch comprising NOR gates 24 and 25 remains set. The output of gate 24 remains high and both the tail/park and headlights remain on. If the controller has been programmed to leave off the head and tail/park lights when the windshield wipers are on via S4 there is a low at the output of gate 21 and at inputs 69 and 77 of gates 31 and 35, a low at the outputs of gates 31, 32, 33, 34, 35, 36, and 37, and a low at the input of Inverter 18. The low at the input of Inverter 18 results in a high at the output of Inverter 18 which is connected to the input of gate 38. With low at the outputs of gates 33 and 37 transistors Q1 and Q2, in series with D3, D5, and the coils of K1 and K2, are cutoff. With transistors Q1 and Q2 cutoff the visual tail/park light and headlight indicators are off while the coils of K1 and K2 fail are off and the normally open contacts of K1 and K2 are open. With the contacts of K1 and K2 open both the tail/park lights and the headlights are off. With a high at the output of gate 38 transistor Q3, in series with D7, the normally closed contacts of K2, and the coil of K3, is saturated. With transistor Q3 in saturation the visual daytime running light indicator D7 is on while the coil of relay K3 is on, through the normally closed contacts of K2, and the contacts, in series with the normally closed contacts of K2, are closed. With the contacts of K3 closed the daytime running lights (low beam headlights) are on.

In the eleventh state the headlight switch S2B of the vehicle electrical system and S5 and S6 of the program module are open, while the ignition switch S1, the tail/park light switch S2A, and the windshield wiper switch S3 of the vehicle electrical system and S4 and S7 of the program module are closed. The S-R latch comprising NOR gates 24 and 25, is reset giving a low at the output of gate 24, while the S-R latch, comprising NOR gates 26 and 27 is set giving a high at the output of gate 26. Also, in the eleventh state the battery is assumed to be fully charged giving a low at the output of Operational amplifier 20. The eleventh state results in a low at the input of Inverters 16, a high at the inputs of Inverters 15 and 17, a high at the output of Inverters 16, and a low at the outputs of Inverters 15 and 17. The eleventh state also results in a low at input 79 of gate 32, a high at inputs 47, 46, 58, 72, 81, and 87, of gates 21, 25, 27, 34, 36, and 38, a high from Inverter 16 at the inputs 48 and 53 of gates 21 and 22, a low from the outputs of Inverters 15 and 17 at the inputs 49, 52, 59, 45, 78, and 88 of gates 21, 22, 23, 24, 35, and 38, and a high at the input of Inverter 18. This results in a low from Inverter 17 on input 45 of gate 24 and a high from the windshield wiper switch on input 46 of gate 25. This sets the S-R latch comprising NOR gates 24 and 25, giving a high on input 50 of gate 21. This also results in a low at the output of Inverter 18 which is connected to input 89 gate 38, a low at the outputs of gates 21, 22, 23, 32, 33, 35, 36, and 38, and a high at the outputs of gates 31, 34, and 37. With a low at the outputs of gates 33 and 38 transistors Q2 and Q3, in series with D5, D7, and the coils of K2 and K3, are cutoff. With transistors Q2 and Q3 cutoff the visual headlight and daytime running light indicators D5 and D7 are off while the coils of relays K2 and K3 are off and K2 and K3 are open. With K2 and K3 open both the daytime running lights and the headlights are off A high at the output of gate 37 puts transistor Q1, in series with D3, and the coil of K1 in saturation. With transistor Q1 saturated the visual tail/park light indicator D3 is on while the coil of relay K1 is on and K1 is closed. With K1 closed the tail/park lights are on. Turning the windshield wiper switch S3 off produces a low at input 46 of gate 25. The S-R latch comprising NOR gates 24 and 25 remains set, the output of gate 24 remains high, and the tail/park lights remain on because of closed tail/park switch S2A. If the controller has been programmed to deactivate both the head and tail/park lights during the operation of the windshield wipers via S4 there is a low at the output of gate 21 and the inputs 69 and 77 of gates 31 and 35, a low at the outputs of gates 32, 33, 35, 36, and 38, and a low at the input of Inverter 18. The low at the input of Inverter 18 results in a high at the output of Inverter 18 which is connected to input 89 of gate 38. With low at the outputs of gates 33 and 38 transistors Q2 and Q3, in series with D5, D7, and the coils of K2 and K3, are cutoff. With transistors Q2 and Q3 cutoff the visual headlight and daytime running light indicators D5 and D7 are off while the coils of K2 and K3 are off and K2 and K3 are open. With K2 and K3 open both the daytime running lights and the headlights are off. With a high at the output of gate 37, because of the closed tail/park light switch S2A, transistor Q1, which is in series with D3, and the contacts of K1, is saturated. With transistor Q1 saturated the visual tail/park light indicator D3 is on while the coil of relay K1 is energized and the contacts of K1 are closed. With the contacts of K1 closed the tail/park lights are on.

In the twelfth state S5 and S6 of the program module are open, while the ignition switch S1, the tail/park light switch S2A, the headlight switch S2B, and the windshield wiper switch S3 of the vehicle electrical system and S4 and S7 of the program module are closed. The S-R latch comprising NOR gates 24 and 25, is reset giving a low at the output of gate 24, while the second S-R latch comprising NOR gates 26 and 27 is set giving a high at the output of gate 26. Also, in the twelfth state the battery is assumed to be fully charged producing a low at the Operational amplifier 20. The twelfth state results in a high at the inputs of Inverters 15, 16, and 17 and a low at the outputs of Inverters 15, 16, and 17. The twelfth state also results in a high at inputs 47, 61, 46, 58, 70, 79, 72, 81, and 87 of gates 21, 23, 25, 27, 31, 32, 34, 36, and 38, a low from the outputs of Inverters 15, 16, and 17 at inputs 48, 49, 52, 53, 59, 45, 78, and 88 of gates 21, 22, 23, 24, 35, and 38, and a low at the input of Inverter 18. This results in a low from Inverter 17 on input 45 of gate 24 and a high from the windshield wiper switch on the input of gate 25. This sets the S-R latch comprising NOR gates 24 and 25, producing a high on the input of gate 21. This also results in a high at the output of Inverter 18 which is connected to input 89 of gate 38, a low at the outputs of gates 21, 22, 23, 35, and 38, and a high at the outputs of gates 31, 32, 33, 34, 36, and 37. With a low at the output of gate 38 transistor Q3, in series with D7, and the coil of relay K3, is cutoff. With transistor Q3 cutoff the visual daytime running light indicator D7 is off while the coil of relay K3 is off and K3 is open. With K3 the daytime running lights are off. With a high at the outputs of gates 33 and 37 transistors Q1 and Q2, in series with D3, D5, and the coils of K1 and K2, are saturated. With transistors Q1 and Q2 saturated the visual tail/park light and headlight indicators D3 and D5 are on while the coils of relays K1 and K2 are energized and K1 and K2 are closed. With K1 and K2 closed both the tail/park lights and the headlights are on. Turning the windshield wiper switch S3 off results in a low at input 46 of gate 25. The state of the S-R latch comprising NOR gates 24 and 25 remains set, the output of gate 24 remains high, and the tail/park and headlights remain on because of the closed switch S2A and S2B. If the controller has been programmed to deactivate the head and tail/park lights during operation of the windshield wipers via S4 there is a low at the output of gate 21 at inputs 69 and 77 of gates 31 and 35, a low at the outputs of gates 35 and 38, and a low at the input of Inverter 18. The low at the input of Inverter 18 results in a high at the output of Inverter 18 which is connected to input 89 of gate 38. With low at the output of gate 38 transistor Q3, in series with D7, and the coil of K3, is cutoff. With transistor Q3 cutoff the daytime running light indicator D7 is off while the coil of K3 is off and K3 is open. With K3 open the running lights are off. With a high at the outputs of gates 33 and 37, because of the closed S2A and S2B, transistors Q1 and Q2, in series with D3, D5, and the contacts of K1 and K2, are saturated. With transistors Q1 and Q2 saturated the tail/park light and headlight indicators D3 and D5 are on while the coils of relays K1 and K2 are energized and K1 and K2 are closed. With K1 and K2 closed the tail/park lights are on.

The truth table for the programmable vehicle light controller is as follows:

Truth TABLE for The Programmable Vehicle Light Controller

|  |  | Minterms | | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | 10 | 11 | 12 | 13 | 14 | 15 |
| Inputs | A | 0 | 0 | 0 | 0 | 0 | 0 | 0 | 0 | 1 | 1 | 1 | 1 | 1 | 1 | 1 | 1 |
|  | B | 0 | 0 | 0 | 0 | 1 | 1 | 1 | 1 | 0 | 0 | 0 | 0 | 1 | 1 | 1 | 1 |
|  | C | 0 | 0 | 1 | 1 | 0 | 0 | 1 | 1 | 0 | 0 | 1 | 1 | 0 | 0 | 1 | 1 |
|  | D | 0 | 1 | 0 | 1 | 0 | 1 | 0 | 1 | 0 | 1 | 0 | 1 | 0 | 1 | 0 | 1 |
| Outputs | X | 0 | x | 0 | 0 | 0 | x | 0 | 0 | 0 | x | 1 | 1 | 1 | x | 1 | 1 |
|  | Y | 0 | x | 0 | 0 | 0 | x | 0 | 0 | 0 | x | 0 | 1 | 1 | x | 0 | 1 |
|  | Z | 0 | x | 0 | 0 | 0 | x | 0 | 0 | 1 | x | 0 | 0 | 0 | x | 0 | 0 |
| Optional Programmable States | | | | | | | | | | | | | | | | | |
| Outputs | X | N | x | 1 | 1 | N | x | 1 | 1 | 0 | x | N | N | 0 | x | N | N |
|  | Y | N | x | 0 | 1 | N | x | 0 | 1 | 0 | x | N | N | 0 | x | N | N |
|  | Z | N | x | 0 | 0 | N | x | 0 | 0 | 0 | x | N | N | 0/1 | x | N | N |

A - Ignition Switch.
B - Windshield Wiper Latch.
C - Tail/Park Light Switch.
D - Headlight Switch.
X - Tail/Park Light State.
Y - Headlight State.
Z - Daytime Running Light State.
x - State That Will Never Occur.
N - None.

Minterms 2, 3, 6, 7, 8, and 9 are programmable minterms in that their operation may be altered by the program module, while the minterms 1, 5, 9, and 13 are not represented since the contacts of the tail/park light switch are always closed with the contacts of the headlight switch.

The alternative embodiment of the present invention shown in FIG. 3 differs from that of FIG. 1 in that the logic of FIG. 1 is performed by a microprocessor unit having a ROM program memory 91, an input port 92, an output port 93, address decoding circuitry 94 and a CPU 95. Suitable Microprocessor units may be selected from those available on the market, including the Intel 8051 and Motorola 68HC05 families. The microprocessor unit 90, operating under a control program resident in the ROM 91, determines the state of the vehicle ignition, tail/park light, and headlight switches, the windshield wiper switch S3, the program module data switches S4, S5, S6, S7, and the state of the battery level detector. The microprocessor unit 90 sets the daytime running light relay K7, the tail/park light relay K5, and the headlight relay K6 based upon the state of the vehicle ignition S1, tail/park light S2A, and headlight switches S2B, the windshield wiper switch S3, the program module data switches S4, S5, S6, and S7, and the battery level detector.

The tail/park light bus 10 of FIG. 3 is connected prior to the vehicle tail/park light switch S2A and powers the 5 Volt voltage regulator 100, Operational amplifiers 102 and 103, Zener Diode D1, relay K5, and as the battery monitor voltage across the voltage divider network R12 and R13 of FIG. 3. A 5 Volt regulator 100 powers level translator 101, and microprocessor unit 90. The headlight bus 11 (FIG. 3) is connected ahead of the vehicle headlight switch S2B and powers relays K6 and K7.

The ignition bus 9 is connected after the vehicle ignition switch S1 and is connected through a protection network to level translator 101. The headlight bus 13 of FIG. 3 is connected behind the vehicle headlight switch S2B and connects through a protection network C5, C6 and R6 to level translator 101. The tail/park light bus 12 is connected after the vehicle tail/park light switch S2A and connects through a protection network C3, C4 and R4 to level translator 101. The windshield wiper bus 14 is connected after the vehicle windshield wiper switch S3 and connects through a protection network C1, C2 and R2 to level translator 101. Signals corresponding to each of these inputs of the level shifter 101 are connected from the level shifter 101 to input port 92 of microprocessor 90.

Two bits of memory in the microprocessor 90 serve as set-reset (S-R) latches. The first S-R latch bit is reset when the ignition switch is turned off or the processor starts. When the ignition switch is off, the processor resets the first bit. When the ignition switch is on and the windshield wiper switch is off, the first S-R bit stays reset. When the windshield wiper switch is on and the ignition switch is also on, the first bit S-R is set. When the windshield wiper switch is off and the ignition switch is on, the S-R latch bit stays set.

The second latch bit is initially set when the ignition switch is turned on or the processor starts. When the ignition switch is on and the output of Operational amplifier 102 is low, the processor sets the second S-R latch bit. When the ignition switch is off and the output of Operational amplifier 102 is low, the second S-R latch stays set. When a low to high transition of Operational amplifier 102 occurs with the ignition switch off, the processor resets the second S-R latch bit. When the ignition switch is on and the output of Operational amplifier 20 is high, the processor resets the second S-R latch bit.

Operational amplifier 103, with D10, R30, R31, and R32 is a voltage reference network. The reference voltage from Operational amplifier 103 is connected at the noninverting input of Operational amplifier 102 which is a voltage comparator. The voltage comparator compares the scaled battery voltage to the reference voltage, and if the scaled battery voltage is greater than the reference voltage then the output of Operational amplifier 102 is low. If the scaled battery voltage is less than the reference voltage then the output of Operational amplifier 102 is high. The value of the reference voltage is established at a level that a high results when the battery voltage droops to the minimum battery voltage that required to start the vehicle.

Resistors R1, R3, R5, and R7 define inputs low at level translator 101 when either the ignition switch S1, the tail/park light switch S2A, the headlight switch S2B, or the windshield wiper switch S3 are off (open) or not connected.

Capacitors C9 and C10 filter out power transients. Input port 92 serves to read the vehicle ignition, tail/park light, and headlight switches and the windshield wiper switch, the program module data switches, and the state of the battery level detector. The ROM 91 contains a resident program which controls the operation of the microprocessor unit 90. Address decoder 94 selects either input port 92 to read the state of the vehicle switches, ROM 91 to read the next instruction of the program, or output port 93 to set the state of the daytime running light K7, tail/park light K5, and headlight K6 relays based upon the current instruction. Microprocessor unit 90, executes the instructions of the resident control program, processes the information, and accordingly sets the state of the relays based upon the state of the vehicle ignition, tail/park light, and headlight switches and the windshield wiper switch, the program module switches, the state of the battery level detector, and the two S-R latch bits.

The microprocessor of FIG. 3 first initializes the input/output ports to perform the read/write operations. The microprocessor unit then enters a loop where it begins by reading the state of the vehicle ignition, tail/park light, and headlight switches and the windshield wiper latch, if all switches are off the microprocessor sets the daytime running light, tail/park light, and headlight relays to off and restarts the loop.

If the ignition and headlight switches and the windshield wiper latch are off and the tail/park light switch is on the microprocessor unit reads the state of programmable data switch S5, if S5 is on the microprocessor unit reads the of the battery level detector, and if the battery level detector is low the microprocessor unit turns the daytime running light and headlight relays off and the tail/park light relay on and repeats the loop. Otherwise, the microprocessor unit clears the daytime running light, tail/park light, and headlight relays, kills its own power supply, and restarts the loop.

Power enters the microprocessor controlled implementation of FIG. 3 through a blocking diode (not shown) and an overvoltage protection circuit comprising a transistor Q8, a resistor, and a Zener diode D11. At low voltages, where there is no current in the Zener diode, a small amount of current flows through the resistor to drive the base of the transistor Q8, which acts as an emitter follower. The emitter provides a voltage approximately 0.7 to 0.9 volts below the input tail/park bus voltage. At higher input voltages, the Zener diode clamps the base voltage of the transistor to its approximately 14 volt Zener voltage, thereby limiting preventing the transistor from driving its emitter voltage to more than about 0.7 volt less than the Zener voltage, even if the collector voltage is driven to 80 volts by a surge on the vehicle's electrical system.

Power from the overvoltage protection circuit of Q8 is applied to the emitter of PNP transistor Q9. This transistor is controlled by the discrete OR gate comprising Q10 and Q11, having an input from the microprocessor and an input from the ignition switch. Whenever the ignition switch S1 is ON, Q10 is ON, and then so is Q9. When Q9 is on, power is applied through a 5 volt integrated regulator, such as a 7805, and thence to the microprocessor. When initially activated, the microprocessor places a logic 1 on the Q11 input of the OR gate, thereby holding its power supply on until such time as the ignition is off and the microprocessor has turned off all of the lights controlled by the module.

Not only may a vehicle's electrical system voltage surge to 80 volts, but it may droop to 3 volts for a hundred milliseconds or so when power is initially applied to the starting motor. In this condition, power for the microprocessor is supplied by capacitors C9 and C10; the charge on these capacitors is prevented from passing back into the vehicle electrical system by the reverse-biased emitter-base junction of transistor Q8 and by a blocking diode (not shown) connected between the collector of Q8 and the tail-park light bus.

If the ignition switch, the windshield wiper latch bit, and the first S-R latch bit are off and the tail/park light and headlight switches are on the microprocessor unit reads the state of programmable data switch S6, if S6 is on the microprocessor reads the battery level detector latch, and if the battery level detector latch is low the microprocessor turns off the daytime running light relay and turns on the headlight and tail/park light relays, and repeats the loop. Otherwise, the microprocessor unit sets the daytime running light, tail/park light, and headlight relays to off kills its own power supply, and repeats the loop.

If the ignition, tail/park light, and headlight switches are off and the windshield wiper latch is on the microprocessor unit sets the daytime running light, tail/park light, and headlight relays to off and repeats the loop.

If the ignition and headlight switches are off and the tail/park light switch and the windshield wiper latch are on the microprocessor unit reads the programmable data switch S5, if S5 is on the microprocessor unit then checks the battery level detector latch bit, the second S-R latch bit, and if the battery level detector latch bit is in low the microprocessor unit sets the daytime running light and headlight relays to off and the tail/park light relay to on and repeats the loop. Otherwise, the microprocessor unit sets the daytime running light, tail/park light, and headlight relays to off, kills its power supply, and repeats the loop.

If the ignition switch is off and the tail/park light, and headlight switches and the windshield wiper latch are on the microprocessor unit reads the programmable data switch S6, if S6 is in on the microprocessor reads the state of the battery level detector, and if the battery level detector latch is low the microprocessor unit sets the daytime running light relay to off and the headlight and tail/park light relays to on and repeats the loop. Otherwise, the microprocessor unit sets the daytime running light, tail/park light, and headlight relays to off, kills its power supply, and repeats the loop.

If the tail/park light and headlight switches and the windshield wiper latch are off and the ignition switch is on the microprocessor unit reads the programmable data switch S7, if S7 is on the microprocessor unit sets the daytime running light relay to on and the tail/park light and headlight relays to off and repeats the loop. Otherwise, the microprocessor unit sets the daytime running light, tail/park light, and headlight relays to off and repeats the loop.

If the windshield wiper latch and the headlight switch are off and the ignition and tail/park light switches are on the microprocessor unit sets the daytime running light and headlight relays to off and the tail/park light relay to on and repeats the loop.

If the windshield wiper latch bit is in off and the ignition, tail/park light, and headlight switches are on the microprocessor unit sets the daytime running light relay off and the tail/park light and headlight relays on and repeats the loop.

If the tail/park light and headlight switches are off and the ignition switch and the windshield wiper latch are on the microprocessor unit reads the state of programmable data switches S4 and S7, if S4 and S7 are on the microprocessor unit turns off the daytime running light relay and the tail/park light and headlight relays to on and again reads the vehicle ignition, tail/park light, windshield wiper, and headlight switches and the windshield wiper latch. If S4 is on and S7 is off the microprocessor unit sets the daytime running light relay to off and the tail/park light and headlight relays to on and repeats the loop. However, if S4 is off and S7 is on the microprocessor unit then sets the daytime running light relay to on and the tail/park light and headlight relays to off and repeats the loop. If both S4 and S7, however, are off the microprocessor unit then sets the daytime running light, tail/park light and headlight relays to off and repeats the loop.

If the headlight switch is off and the ignition and tail/park light switches and the windshield wiper latch are on the microprocessor unit sets the daytime running light and headlight relays to off and the tail/park light relay to on and repeats the loop.

If the ignition, tail/park light, and headlight switches and the windshield wiper latch are on the microprocessor unit sets the daytime running light relay to the off state and the tail/park light and headlight relays to on and repeats the loop.

Figure 4A:
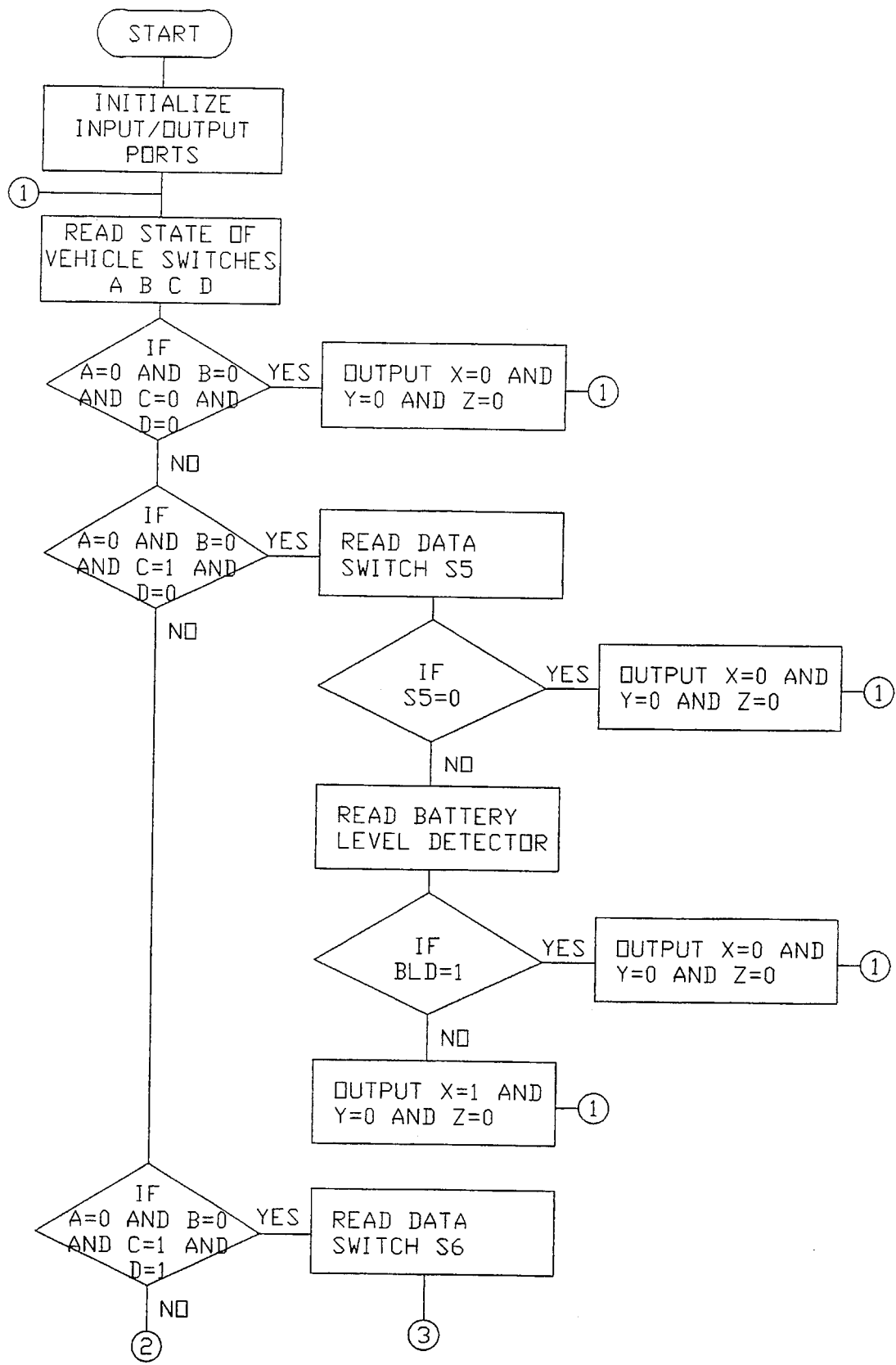
FIG. 4A, a first portion of a flow chart of a program by which the microprocessor may implement the logic of the alternative embodiment of the invention.
Figure 4B:
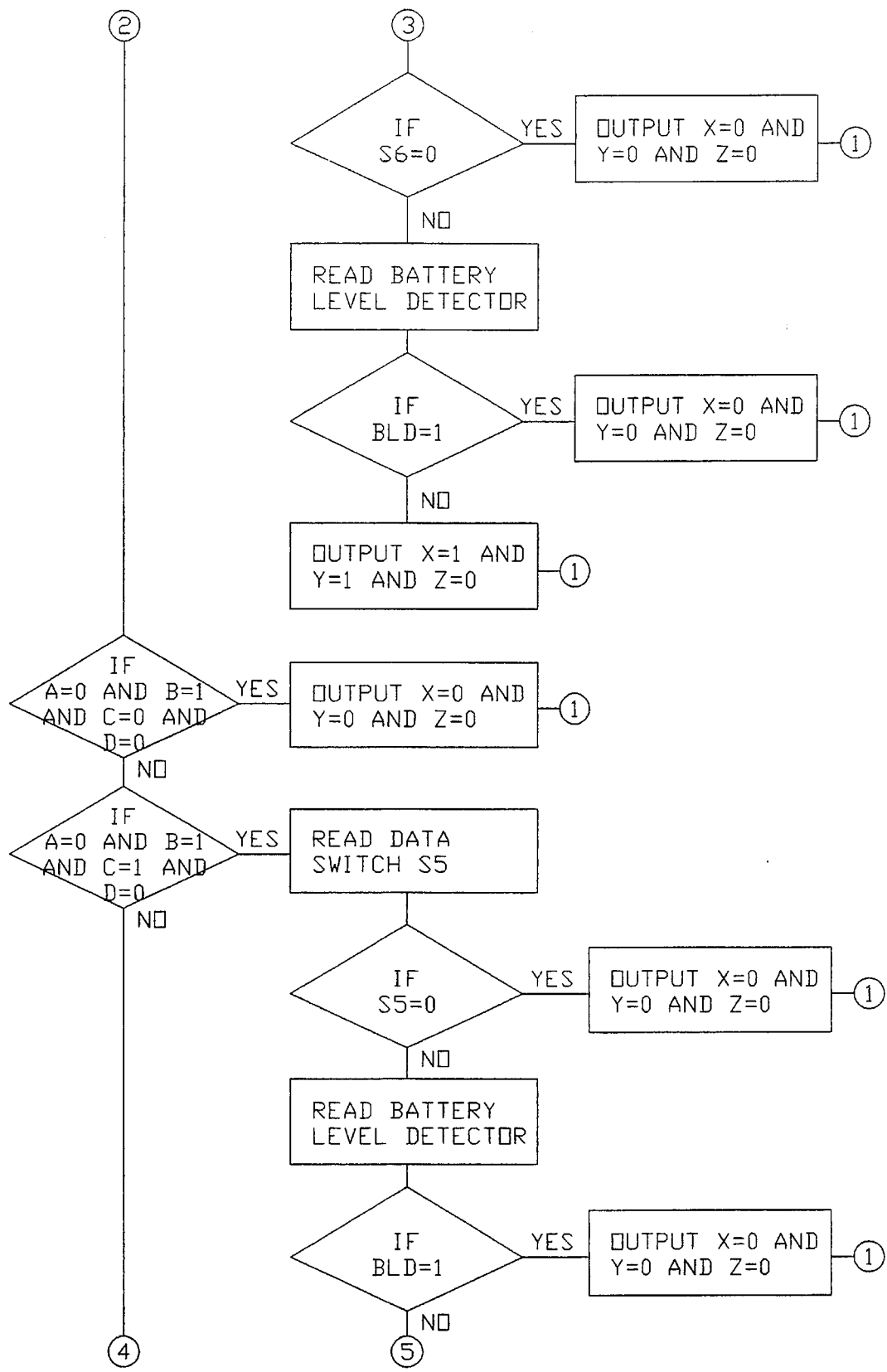
FIG. 4B, a second portion of a flow chart of a program by which the microprocessor may implement the logic of the alternative embodiment of the invention.
Figure 4C:
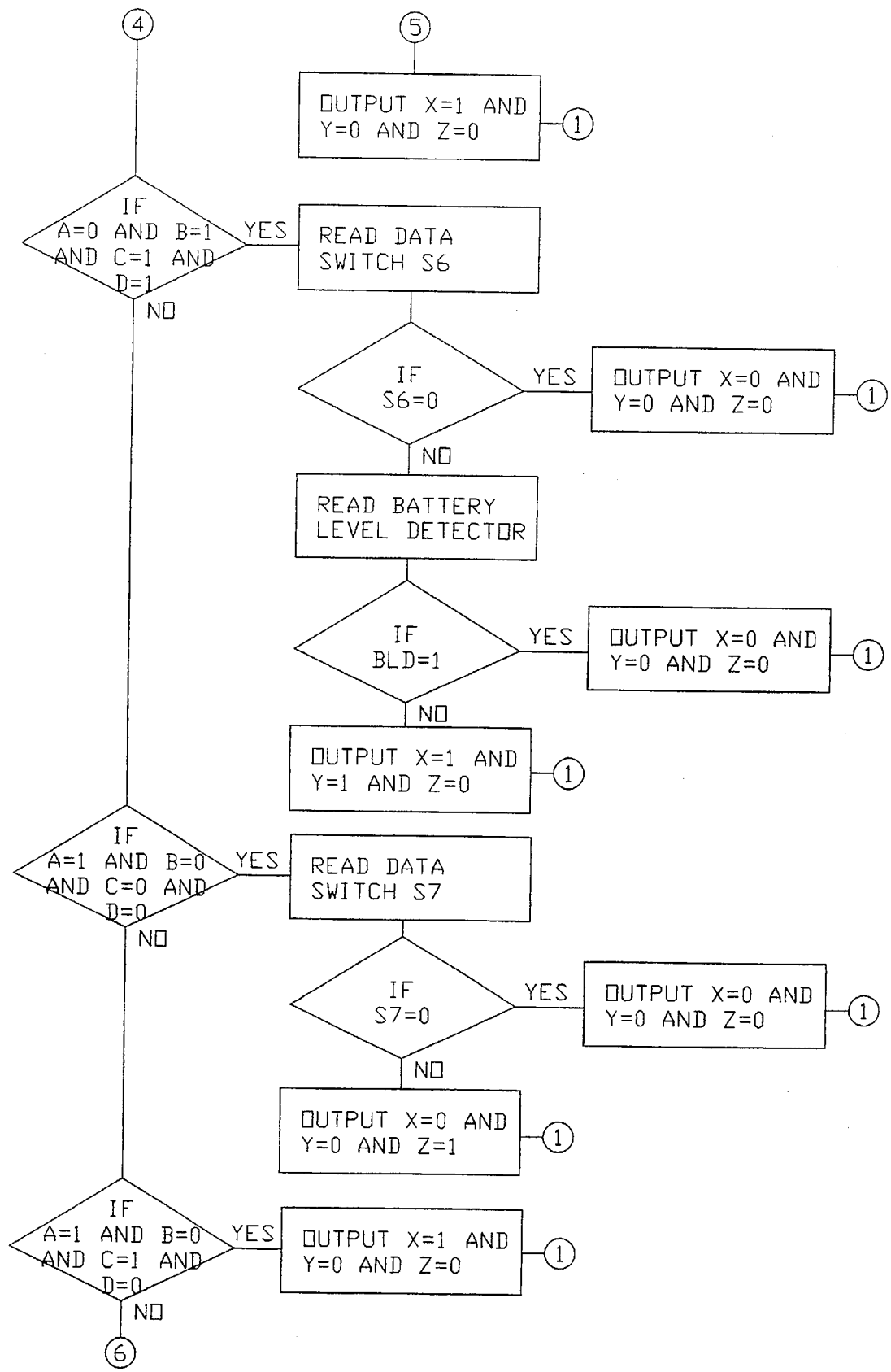
FIG. 4C, a third portion of a flow chart of a program by which the microprocessor may implement the logic of the alternative embodiment of the invention.
Figure 4D:
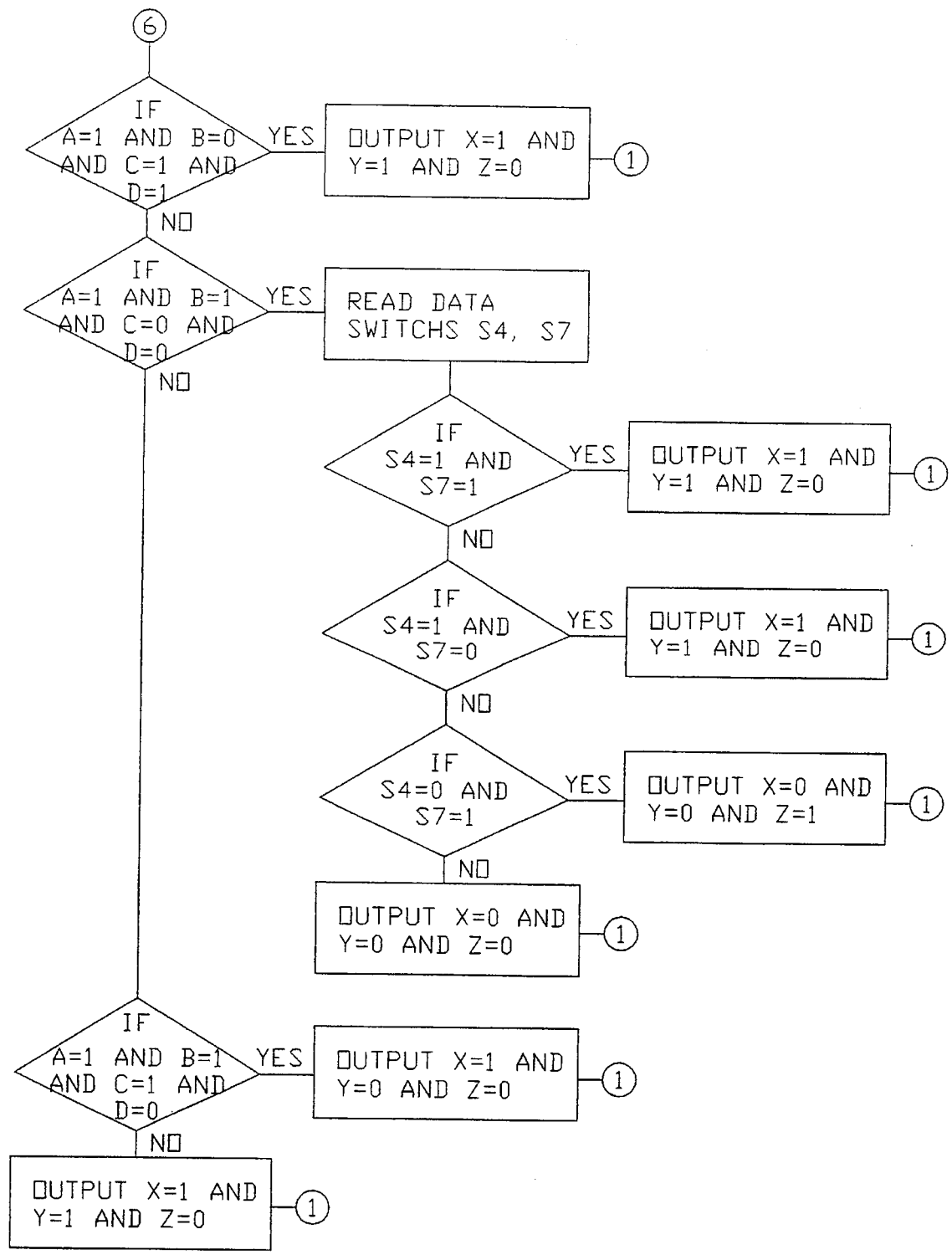
FIG. 4D, a fourth portion of a flow chart of a program by which the microprocessor may implement the logic of the alternative embodiment of the invention.

The flow chart for the resident program which controls the operation of the microprocessor unit is shown in FIGS. 4A, 4B, and 4C and the legend for the variables in the flow chart is as follows:

LEGEND

A - Vehicle Ignition Switch.
B - Windshield Wiper Latch.
C - Tail/Park Light Switch.
D - Headlight Switch.
S4 - Windshield Wiper Programmable Data Switch.
S5 - Tail/Park Light Programmable Data Switch.
S6 - Headlight Programmable Data Switch.
S7 - Daytime Running Light Programmable Data Switch.
X - Tail/Park Light State.
Y - Headlight State.
Z - Daytime Running Light State.

Many vehicles today are equipped with interval wipers, or two speed wipers. Control switches for these lighting systems are sometimes located in the steering column, such that the output of the wiper switch S3 is not directly accessible for use with the programmable vehicle light controller of the present invention. In these vehicles, wire W1 connecting to J1B may be attached to the pulse signal connecting the wiper controller to the wiper motor.

The microcomputer controlled implementation of FIG. 3 may also carry out a time delay function. A time delay may be implemented either with a timer, or with a loop iteration counter. When the time delay function is enabled, the headlights and tail-park lights are on, and the ignition is turned off, the microcomputer will read the input port and find that the ignition is off. If the battery voltage is below the threshold of the comparator, the microcomputer will turn off all of the lights immediately, and shut down its power supply. Otherwise, the microcomputer will leave the lights on for a first time delay period, of about three minutes, and read the switches again.

Upon reading the switches upon expiry of the first delay, if the operator has turned off the headlight portion S2B of the head and tail/park light switch S2, the microcomputer will turn off the headlights by turning off the relay K6. If the operator has turned off the tail/park light portion S2A of the head and tail/park light switch S2, the microcomputer will turn off the tail/park lights by turning off relay K5. If the operator has left the tail/park and headlight switch S2 on, the microcomputer will read the programming switches and set the relays accordingly, as described above.

The microcomputer will then repeatedly poll the switches, and the battery voltage, and will shut off the remaining lights upon detecting a low battery voltage.

The above discussion has assumed use of electromechanical relays. It is understood that electronic relays are a useable equivalent to electromechanical relays. Further, the lights may be directly controlled with semiconductor devices such as high current field effect transistors in place of relays.

Semiconductor devices allow creation of daytime running lights by pulse-width modulating current to headlights, thereby simulating operation of the headlight at a reduced voltage. This technique can be applied to the low beam daytime running lights previously discussed, or can be used to transform the high beam headlights into daytime running lights.

Where the above discussion has centered on an ignition switch for indicating to the programmable vehicle light controller that the vehicle is in operation, it is possible to use other means for sensing that the vehicle is in operation. For example, a vehicle in operation signal could be derived from a fuel injector pulse, from a crankshaft position sensor, or from the vehicle charging system.

Yet another embodiment of the present invention utilizes a plurality of nonvolatile memory bits in a microprocessor memory system for programming purposes instead of the previously discussed programming switches. These memory bits are set or cleared by the microprocessor in response to entries made by the vehicle operator on a keyboard. The term programming means therefore incorporates nonvolatile or CMOS keep-alive memory bits as well as programming switches.

Figure 5:
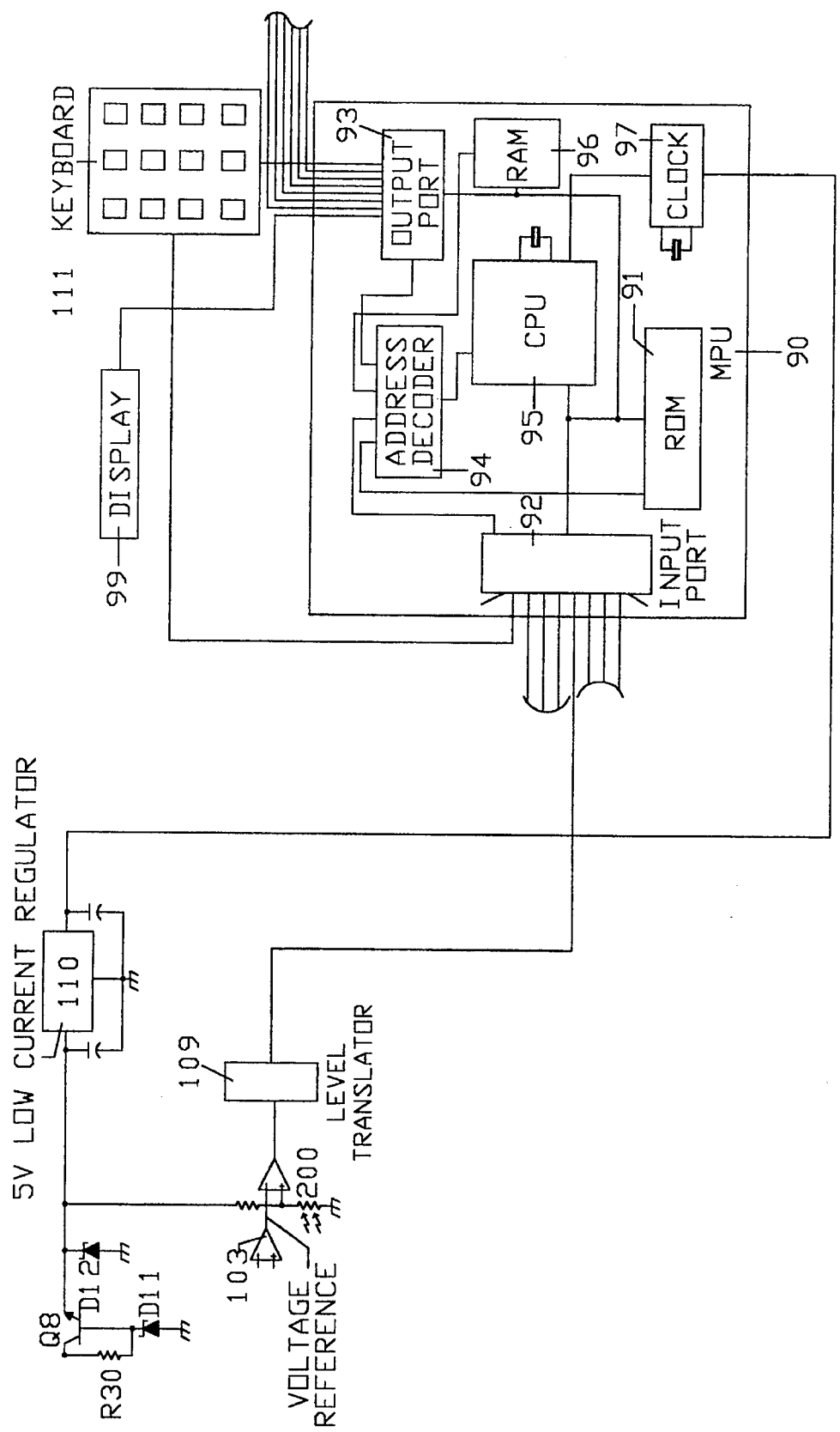
FIG. 5, a partial schematic diagram of an embodiment of the present invention having a low light sensor, a keyboard, and a display.

The microprocessor implementation of FIG. 3 provides opportunity to implement at low cost features that are not practical in the discrete logic embodiment of FIG. 1. Among these additional features is a display 99 (FIG. 5, showing additions to FIG. 3), a keypad 111 and a clock, implemented with a calendar-clock chip 97. The clock chip 97 is powered by an additional 5-volt regulator device 110 that is powered by the unswitched, but overvoltage protected, power available at the emitter of overvoltage protection transistor QS. This microprocessor embodiment of the present invention is programmable by a vehicle operator to automatically turn on the tail/park and head lights during particular hours of operation that may be set by the operator, such as from 6:00 P.M. to 8:00 A.M.; automatically turning these lights off when the vehicle ignition switch is turned off. Further, the microprocessor controlled embodiment is programmable by the vehicle operator to, during preset hours such as 9:00 A.M. and 4:30 P.M., turn off head and tail park lights activated by activation of the windshield wipers when the windshield wipers have been off for approximately five minutes and the vehicle light switch S2 is off.

In yet another embodiment of the microprocessor controlled embodiment, a photoconductive device 200 (FIG. 5), such as a cadmium sulphide cell, is provided for monitoring the level of ambient light about the vehicle. A signal from photoconductive device 200 is compared with the reference voltage from operational amplifier 103, and passed through a level translator 109 to an additional input line of the input port 92 of the microcontroller 110. In this embodiment, the programmable vehicle light controller detects when the vehicle is subject to a low ambient light level, such as when the vehicle is in a tunnel or is driven at night, and responds, if programmed by the vehicle operator to do so, by turning on the head and tail/park lights.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A vehicle lighting system, for use in automobiles or trucks or other vehicles intended to be driven by a driver, where the vehicle has an electrical system incorporating an electric starter and a battery, comprising:

a tail lamp;

a tail lamp relay having a control input, connected such that an electrical current flows through the battery, the tail lamp, and the tail lamp relay when the control input is in a first state, and current does not flow through the tail lamp when the control input is in a second state;

tail lamp switching means;

battery low voltage sensing means;

taillamp programming means;

means for sensing that the vehicle is in operation;

control means configured such that the control input of the tail lamp relay is in the first state whenever the vehicle is in operation and the tail lamp switching means is in a first state, or following the vehicle ceasing operation, the taillamp programming means is in a first state, and the battery low voltage sensing means senses a high battery voltage, but where the control input of the tail lamp relay is placed in the second state whenever the vehicle is not in operation and either the taillamp programming means is in a second state or the battery low voltage sensing means senses a low battery voltage.

2. The vehicle lighting system of claim 1, further comprising:

a headlight system having low beam and high beam lamps;

a headlight relay;

a high-low beam switch, where with the high-low beam switch in a first state and a control input of the headlight relay in a first state power is transmitted from the battery through the headlight relay to the high beam lamp, with the control input of the headlight relay in the first state and the high-low beam switch in the second state power is transmitted from the battery through the headlight relay to the low beam lamp, and where with the control input of the headlight relay in a second state power is not transmitted from the battery to the high beam lamp irrespective of the state of the high-low beam switch;

headlamp switching means;

headlamp programming means; and wherein the control means such that the control input of the headlight relay is in the first state whenever the vehicle is in operation and the headlamp switching means is in a first state, where the control input of the headlight relay is in the first state when the vehicle ceases operation with the headlamp switching means is in the first state and the headlamp programming means is in a first state, but where the control input of the headlight relay is placed in the second state whenever the vehicle is not in operation and either the headlamp programming means is in a second state or the battery low voltage sensing means senses a low battery voltage.

3. The vehicle lighting system of claim 2, further comprising:

a wiper control having a first state and a second state;

wiper latching means having a first and a second state, where the wiper latching means is placed in the first state whenever the vehicle is in operation and the wiper control is in the first state, and where the wiper latching means is placed in the second state whenever the vehicle is not in operation;

where the control means places the control input of the tail lamp relay in the first state when the wiper latching means is in the first state irrespective of the state of the tail lamp switching means.

4. The vehicle lighting system of claim 3, further comprising:

a daytime running light relay connected such that with a control input of the daytime running light relay in a first state power is transmitted from the battery to at least one headlight lamp;

daytime running light programming means;

where the control means places the control input of the daytime running light relay in the first state when the headlamp switching means is in the second state, the vehicle is in operation, and the daytime running light programming means is in a first state, but where the control input of the daytime running light relay is in a second state when the headlamp switching means is in the second state, and either the vehicle is not in operation or the daytime running light programming means is in a second state.

5. The vehicle lighting system of claim 1, further comprising:

a wiper control having a first state and a second state;

wiper latching means having a first and a second state, where the wiper latching means is placed in the first state whenever the vehicle is in operation and the wiper control is in the first state, and where the wiper latching means is placed in the second state whenever the vehicle is not in operation;

where the control means places the control input of the tail lamp relay in the first state when the wiper latching means is in the first state irrespective of the state of the tail lamp switching means.

6. The vehicle lighting system of claim 5, wherein the low battery voltage is a battery voltage sufficiently great that the electric starter will operate; but where the low battery voltage is a voltage not normally occurring while the vehicle is in operation.

7. A vehicle light controller, for use as a component of the lighting system of vehicles including automobiles or trucks, where the vehicle has a headlamp system comprising high and low beam lamps, a high-low beam switch, and headlamp switching means, where the vehicle has tail lamps and tail lamp switching means, where the vehicle has electric windshield wipers and wiper switching means, and where the vehicle has an electrical system incorporating an electric starter and a battery, comprising:

a tail lamp battery input;

a tail lamp output;

a tail lamp relay having a control input, connected such that an electrical current flows between the tail lamp battery input to the tail lamp output when the control input is in a first state, and that current does not flow between the tail lamp battery input and the tail lamp output when the control input is in a second state;

a tail lamp switching means input;

battery low voltage sensing means;

taillamp programming means;

a vehicle in operation input;

control means configured such that the control input of the tail lamp relay is in the first state whenever the vehicle is in operation and the tail lamp switching means input is in a first state, or following the vehicle ceasing operation, the taillamp programming means is in a first state, and the battery low voltage sensing means senses a high battery voltage, but where the control input of the tail lamp relay is placed in the second state whenever the vehicle is not in operation and either the taillamp programming means is in a second state or the battery low voltage sensing means senses a low battery voltage.

8. The vehicle light controller of claim 7, further comprising:

a headlight relay;

a headlight battery input;

a headlight output;

where with a control input of the headlight relay in a first state power is transmitted between the headlamp battery input and the headlight output, and where with the control input of the headlight relay in a second state power is not transmitted between the headlamp battery input and the headlight output;

a headlamp switching means input;

headlamp programming means; and control means such that the control input of the headlight relay is in the first state whenever the vehicle is in operation and the headlamp switching means input is in a first state, where the control input of the headlight relay is in the first state when the vehicle ceases operation with the headlamp switching means input in the first state and the headlamp programming means is in a first state, but where the control input of the headlight relay is placed in the second state whenever the vehicle is not in operation and either the headlamp programming means is in a second state or the battery low voltage sensing means senses a low battery voltage.

9. The vehicle light controller of claim 8, further comprising:

a wiper control input having a first state and a second state;

wiper latching means having a first and a second state, where the wiper latching means is placed in the first state whenever the vehicle is in operation and the wiper control input is in the first state, and where the wiper latching means is placed in the second state whenever the vehicle is not in operation;

where the control means places the control input of the tail lamp relay in the first state when the wiper latching means is in the first state irrespective of the state of the tail lamp switching means.

10. The vehicle light controller of claim 8, further comprising:

a daytime running light relay connected such that with a control input of the daytime running light relay in a first state power is transmitted between the headlight battery input to a daytime running light output;

daytime running light programming means;

where the control means places the control input of the daytime running light relay in the first state when the headlamp switching means input is in the second state, the vehicle is in operation, and the daytime running light programming means is in a first state, but where the control input of the daytime running light relay is in a second state when the headlamp switching means input is in the second state, and either the vehicle is not in operation or the daytime running light programming means is in a second state.

11. The vehicle light controller of claim 10, further comprising:

a wiper control input having a first state and a second state;

wiper latching means having a first and a second state, where the wiper latching means is placed in the first state whenever the vehicle is in operation and the wiper control input is in the first state, and where the wiper latching means is placed in the second state whenever the vehicle is not in operation;

where the control means places the control input of the tail lamp relay in the first state when the wiper latching means is in the first state irrespective of the state of the tail lamp switching means input.

12. The vehicle light controller of claim 7, further comprising:

a wiper control input having a first state and a second state;

wiper latching means having a first and a second state, where the wiper latching means is placed in the first state whenever the vehicle is in operation and the wiper control input is in the first state, and where the wiper latching means is placed in the second state whenever the vehicle is not in operation;

where the control means places the control input of the tail lamp relay in the first state when the wiper latching means is in the first state irrespective of the state of the tail lamp switching means input.

13. A vehicle light control device, for use as a component of the lighting system of vehicles including automobiles or trucks, where the vehicle has a headlamp system comprising high and low beam lamps, a high-low beam switch, and headlamp switching means, where the vehicle has tail lamps and tail lamp switching means, where the vehicle has electric windshield wipers and wiper switching means, and where the vehicle has an electrical system incorporating an electric starter and a battery, comprising:

a tail lamp battery input;

a tail lamp output;

a tail lamp relay having a control input, connected such that an electrical current flows between the tail lamp battery input to the tail lamp output when the control input is in a first state, and that current does not flow between the tail lamp battery input and the tail lamp output when the control input is in a second state;

a tail lamp switching means input;

taillamp programming means;

a vehicle in operation input;

control means configured such that the control input of the tail lamp relay is in the first state whenever the vehicle is in operation and the tail lamp switching means input is in a first state, but where the control input of the tail lamp relay is placed in the second state when the vehicle is not in operation and the taillamp programming means is in a second state.

14. The vehicle light control device of claim 13, further comprising:

a headlight relay;

a headlight battery input;

a headlight output;

where with a control input of the headlight relay in a first state power is transmitted between the headlamp battery input and the headlight output, and where with the control input of the headlight relay in a second state power is not transmitted between the headlamp battery input and the headlight output;

a headlamp switching means input;

headlamp programming means; and wherein the control means such that the control input of the headlight relay is in the first state whenever the vehicle is in operation and the headlamp switching means input is in a first state, where the control input of the headlight relay is in the first state when the vehicle ceases operation with the headlamp switching means input in the first state and the headlamp programming means is in a first state, but where the control input of the headlight relay is placed in the second state whenever the vehicle is not in operation and the headlamp programming means is in a second state.

15. The vehicle light control device of claim 14, further comprising:

a wiper control input having a first state and a second state;

wiper latching means having a first and a second state, where the wiper latching means is placed in the first state whenever the vehicle is in operation and the wiper control input is in the first state, and where the wiper latching means is placed in the second state whenever the vehicle is not in operation;

where the control means places the control input of the tail lamp relay in the first state when the wiper latching means is in the first state irrespective of the state of the tail lamp switching means input.

16. The vehicle light control device of claim 15, wherein the wiper latching means is reset to the second state when the wiper control input has remained in the second state for a preset time.

17. The vehicle light control device of claim 16, further comprising an ambient light sensor, wherein the control means is configured to put the control input of the headlight relay in the first state, and the control input of the tail lamp relay in the first state, when the ambient light sensor detects a low light level and the vehicle is in operation.

18. The vehicle light control device of claim 16, further comprising a clock, wherein the control means is configured to put the control input of the headlight relay in the first state, and the control input of the tail lamp relay in the first state, when the clock indicates a time in a preset range, and the vehicle is in operation.

* * * * *